United States Patent
Kakutani

(10) Patent No.: US 7,929,156 B2
(45) Date of Patent: Apr. 19, 2011

(54) TECHNIQUE FOR IMAGE DATA RECORDING

(75) Inventor: Toshiaki Kakutani, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 748 days.

(21) Appl. No.: 10/811,078

(22) Filed: Mar. 26, 2004

(65) Prior Publication Data

US 2005/0063015 A1 Mar. 24, 2005

(30) Foreign Application Priority Data

Mar. 27, 2003 (JP) ................................. 2003-087218
Jul. 10, 2003 (JP) ................................. 2003-195071

(51) Int. Cl.
*H04N 1/405* (2006.01)
*H04N 1/409* (2006.01)

(52) U.S. Cl. ......... 358/1.12; 358/1.9; 358/1.8; 358/517; 358/534; 358/536; 347/15; 347/43

(58) Field of Classification Search .................. 358/1.12, 358/1.9, 1.8, 517, 534, 536; 347/15, 43
See application file for complete search history.

(56) References Cited

U.S. PATENT DOCUMENTS

| | | | | |
|---|---|---|---|---|
| 6,293,643 B1 * | 9/2001 | Shimada et al. | ................. | 347/15 |
| 6,652,067 B2 * | 11/2003 | Otsuki | ............................ | 347/41 |
| 2003/0112293 A1 * | 6/2003 | Shimizu et al. | ................. | 347/43 |

FOREIGN PATENT DOCUMENTS

JP 2000-115716 4/2000

OTHER PUBLICATIONS

Abstract of Japanese Patent Publication 2000-115716, Pub. Date: Apr. 21, 2000, Patent Abstracts of Japan.

* cited by examiner

*Primary Examiner* — David K Moore
*Assistant Examiner* — Quang N Vo
(74) *Attorney, Agent, or Firm* — Martine Penilla & Gencarella, LLP

(57) ABSTRACT

In an image output control system of the invention, an image processing device makes image data subjected to a preset series of image processing and supplies the processed image data to an image output device, which then outputs a resulting processed image. The image processing device determines the number of dots to be created in each pixel group, which has a preset number of multiple pixels included in an image, and outputs the determined number of dots as dot number data to the image output device. The image output device stores multiple options for a priority order of individual pixels included in each pixel group for dot formation. In response to reception of the dot number data, the image output device selects one among the multiple options for the priority order, determines the positions of dot-on pixels in the pixel group, and actually creates dots at the determined positions of the dot-on pixels to output a resulting image. In the image output control system of the invention, the image processing device supplies the dot number data to the image output device. Even when an image includes a large number of pixels, this arrangement ensures quick data supply and thereby prompt image output.

13 Claims, 38 Drawing Sheets

MAIN SCANNING DIRECTION

SUB-SCANNING DIRECTION

Fig.6(a)

| 97 | 102 | 104 |
|---|---|---|
| 94 | 99 | 101 |
| 92 | 96 | 99 |

Fig.6(b)

| 97 | 97 | 97 | 97 | 102 | 102 | 102 | 102 | 104 | 104 | 104 | 104 |
|---|---|---|---|---|---|---|---|---|---|---|---|
| 97 | 97 | 97 | 97 | 102 | 102 | 102 | 102 | 104 | 104 | 104 | 104 |
| 94 | 94 | 94 | 94 | 99 | 99 | 99 | 99 | 101 | 101 | 101 | 101 |
| 94 | 94 | 94 | 94 | 99 | 99 | 99 | 99 | 101 | 101 | 101 | 101 |
| 92 | 92 | 92 | 92 | 96 | 96 | 96 | 96 | 99 | 99 | 99 | 99 |
| 92 | 92 | 92 | 92 | 96 | 96 | 96 | 96 | 99 | 99 | 99 | 99 |

| 3 | 4 | 4 |
|---|---|---|
| 3 | 2 | 3 |
| 2 | 3 | 3 |

| 1 | 177 | 58 | 170 |
|---|---|---|---|
| 255 | 109 | 212 | 42 |

| 1 | 177 | 58 | 170 |
|---|---|---|---|
| 255 | 109 | 212 | 42 |

Fig.13(a)

| 255,212,177,170, 109, 58, 42, 1 | 242,223,186,161, 79,70,48,5 | 248,209,171,164, 94,81,67,16 |
|---|---|---|
| 237,219,181,127, 123,91,33,22 | 198,188,155,140, 121,105,83,61 | 215,182,150,119, 111,98,30,3 |
| 195,184,144,136, 107,99,53,11 | 247,227,172,151, 97,68,37,12 | 237,233,192,173, 135,84,77,52 |

Fig.13(b)

| 255,212,177,170, 109,[58, 42, 1] | 242,223,186,161, [79, 70, 48, 5] | 248,209,171,164, [94, 81, 67, 16] |
|---|---|---|
| 237,219,181,127, 123,[91, 33, 22] | 198,188,155,140, 121,105,[83, 61] | 215,182,150,119, 111,[98, 30, 3] |
| 195,184,144,136, 107,[99, 53, 11] | 247,227,172,151, 97,[68, 37, 12] | 237,233,192,173, 135,[84, 77, 52] |

Fig.13(c)

| 3 | 4 | 4 |
|---|---|---|
| 3 | 2 | 3 |
| 2 | 3 | 3 |

Fig.16(a)

| 97 | 100 | 97 | 99 | 102 | 104 | 101 | 103 |
|----|-----|----|----|-----|-----|-----|-----|
| 98 | 99 | 100 | 98 | 103 | 102 | 104 | 101 |
| 94 | 96 | 95 | 93 | 99 | 102 | 129 | 130 |
| 93 | 95 | 94 | 94 | 101 | 100 | 132 | 131 |

Fig.16(b)

| 99 | 103 | | | |
|----|-----|---|---|---|
| 94 | 99 | 102 | 129 | 130 |
|    | 101 | 100 | 132 | 131 |

Fig.17(a) | 4-Bit Data | (0～8)

Fig.17(b) | 1 | 0 | 0 | 1 | 8-Bit Data |

Fig.17(c)

| ① | ② | ③ | ④ |
|---|---|---|---|
| ⑤ | ⑥ | ⑦ | ⑧ |

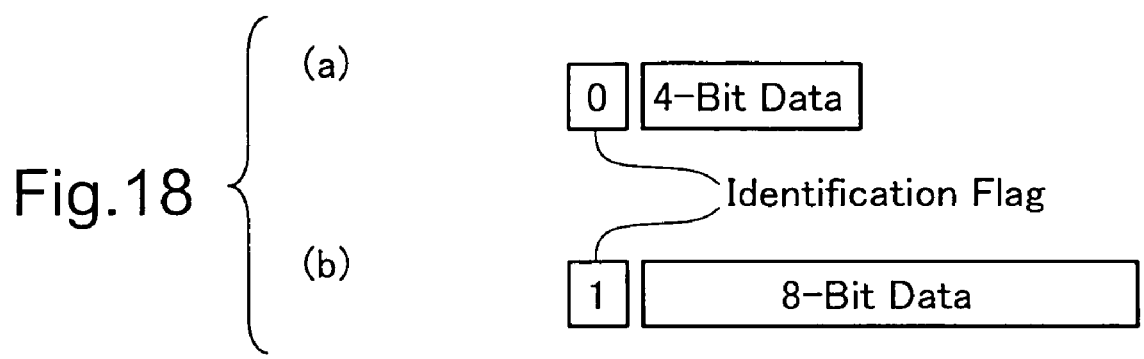

Fig.22(a)

| Data(L,M,S) =(2,90,32) | (0,90,40) | (0,85,50) |
|---|---|---|
| (0,92,28) | (5,80,32) | (10,50,32) |
| (5,85,52) | (15,60,43) | (20,70,32) |

Fig.22(b)

| Dot(L,M,S) = (1,2,1) | (0,4,0) | (0,3,1) |
|---|---|---|
| (0,3,0) | (0,2,1) | (1,1,0) |
| (0,2,3) | (1,2,1) | (0,3,0) |

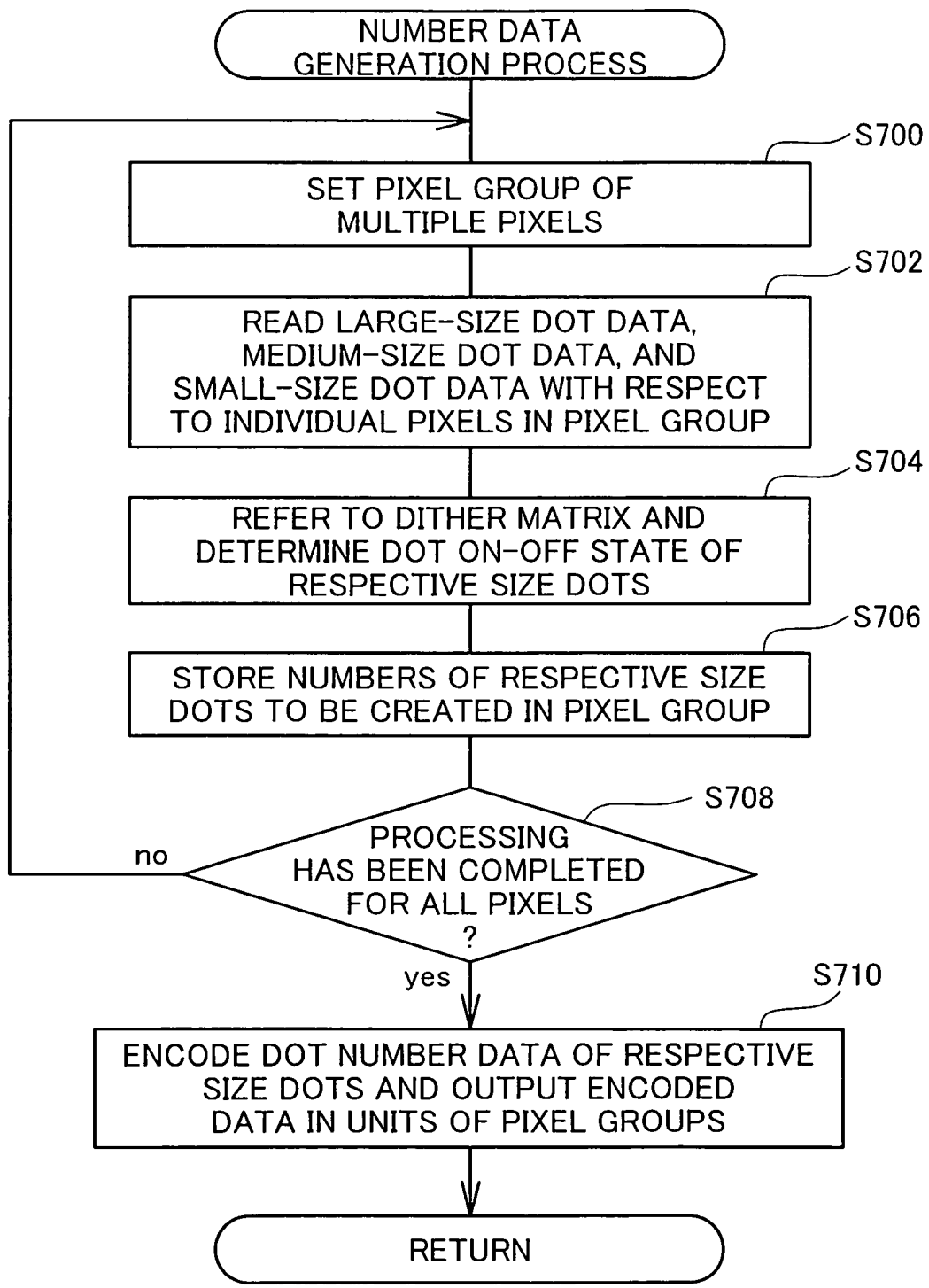

Fig.25

| Dot Numbers | | | Code Number |
|---|---|---|---|
| Small-Size Dot | Medium-Size Dot | Large-Size Dot | |
| 0 | 0 | 0 | 0 |
| 1 | 0 | 0 | 1 |
| 2 | 0 | 0 | 2 |
| 3 | 0 | 0 | 3 |
| 0 | 2 | 6 | 161 |
| 0 | 0 | 7 | 162 |
| 1 | 0 | 7 | 163 |
| 0 | 1 | 7 | 164 |
| 0 | 0 | 8 | 165 |

Fig.33

| Code Number | Dot Numbers | | |
|---|---|---|---|
| | Large-Size Dot | Large-Size Dot + Medium-Size Dot | Large-Size Dot + Medium-Size Dot + Small-Size Dot |
| 0 | 0 | 0 | 0 |
| 1 | 0 | 0 | 1 |
| 2 | 0 | 0 | 2 |
| 3 | 0 | 0 | 3 |
| 161 | 6 | 8 | 8 |
| 162 | 7 | 7 | 7 |
| 163 | 7 | 7 | 8 |
| 164 | 7 | 8 | 8 |
| 165 | 8 | 8 | 8 |

TECHNIQUE FOR IMAGE DATA RECORDING

TECHNICAL FIELD

The present invention relates to a technique of making image data subjected to a preset series of image processing and outputting a resulting processed image. More specifically the invention pertains to a technique of quickly transferring processed image data, which has gone through a preset series of image processing, to an image output device and thereby ensuring prompt output of a resulting processed image.

BACKGROUND ART

Image output devices that create dots on various output media, for example, printing media and liquid crystal screens, to express an image are widely used as the output device of diverse imaging equipment. The image output device divides an image into a number of small elements called pixels and creates dots in these pixels. Each pixel takes only either of two states, that is, a dot-on state and a dot-off state. The image as a whole may have areas of dense dot formation and areas of sparse dot formation. Each image is thus expressed by varying the dot formation density. For example, in the case of formation of dots with black ink on white printing paper, the areas of dense dot formation express dark areas, whereas the areas of sparse dot formation express bright areas. As another example, in the case of formation of luminescent spots as dots on a liquid crystal screen, the areas of dense dot formation express bright areas, whereas the areas of sparse dot formation express dark areas. Adequate regulation of the dot formation density enables output of a multi-tone image.

Control data of the dot formation density is obtained by a preset series of image processing of object image data, which represents an object image to be output. The image-processed data is supplied to the image output device, which then creates dots in pixels specified by the supplied data. Dots are accordingly created at adequate densities on an output medium to express a resulting image.

The higher picture quality and the larger size of output images have been demanded for such image output devices. One effective measure to the better-quality demand divides an image into smaller pixels. Size reduction of pixels makes dots created in these small pixels inconspicuous and thereby enhances the picture quality of a resulting image (see, for example, Japanese Patent Laid-Open Gazette No. 2000-115716). The size expansion demand is fulfilled, on the other hand, by increasing the total number of pixels. Size expansion of individual pixels naturally expands the size of an output image, but undesirably lowers the picture quality of the output image. The effective measure to the size expansion demand thus increases the total number of pixels.

These measures to the better-quality demand and the size expansion demand of the output image, however, hinder quick image output. Let alone the increased number of pixels for the size expansion of the output image, the size reduction of individual pixels for the enhanced picture quality of the output image results in increasing the total number of pixels included in one image. As mentioned above, the image output device receives control data of dot formation and outputs an image according to the received control data. The increase in number of pixels included in one image thus undesirably extends the time required for data supply and interferes with prompt image output.

SUMMARY OF THE INVENTION

In view of the drawbacks of the prior art techniques, the object of the invention is to provide a technique of accelerating supply of control data of dot formation to an image output device and thereby attaining prompt image output.

In order to attain at least part of the above and the other related objects, the present invention is directed to an image output control system, which includes an image processing device that makes image data subjected to a preset series of image processing, and an image output device that creates multiple different types of dots having different densities per unit area according to a result of the preset series of image processing, so as to output an image.

The image processing device includes: a dot number determination module that determines a number of dots to be created in each pixel group, which is set to have a predetermined number of multiple pixels included in the image, with respect to each of the multiple different types of dots according to the image data; and a number data output module that outputs the determined number of dots to be created in the pixel group with respect to each type of dot, as dot number data of the pixel group, to the image output device.

The image output device includes: a number data receiving module that receives the dot number data of the pixel group with respect to each type of dot; a priority order specification module that specifies a priority order of individual pixels in the pixel group for dot creation; a pixel position determination module that determines positions of dot-on pixels in the pixel group with respect to each type of dot, based on the dot number data of the pixel group with respect to each type of dot and the specified priority order; and a dot formation module that creates the multiple different types of dots at the determined positions of the dot-on pixels.

There is an image output control method corresponding to the image output control system described above. Another application of the present invention is accordingly an image output control method that makes image data subjected to a preset series of image processing and creates multiple different types of dots having different densities per unit area according to a result of the preset series of image processing, so as to output an image.

The image output control method includes: a first step of determining a number of dots to be created in each pixel group, which is set to have a predetermined number of multiple pixels included in the image, with respect to each of the multiple different types of dots according to the image data; a second step of specifying a priority order of individual pixels in the pixel group for dot creation; a third step of determining positions of dot-on pixels in the pixel group with respect to each type of dot, based on the determined number of dots to be created in the pixel group with respect to the type of dot and the specified priority order; and a fourth step of creating the multiple different types of dots at the determined positions of the dot-on pixels on an output medium.

The image output control system and the corresponding image output control method of the invention generate dot number data representing the number of dots to be created in each pixel group, which is set to have a predetermined number of multiple pixels included in an image, with respect to each of the multiple different types of dots. The positions of the dot-on pixels, where the respective types of dots are created, in the pixel group are determined, based on the specified priority order of the pixel group and the dot number data of the respective types of dots with regard to the pixel group. The respective types of dots are created at the determined positions of the dot on-pixels.

The dot number data representing the number of dots to be created in each pixel group occupies a significantly smaller data capacity, compared with the data representing the dot on-off state of individual pixels included in the pixel group.

Conversion of the image data to the dot number data of respective pixel groups thus reduces the required volume of data output and attains quick data output. Even when an object image has a large number of pixels, this arrangement completes data output within a short time period and thus enables prompt image output. Especially in the case of creation of multiple different types of dots, the method of outputting the data representing the dot on-off state of individual pixels with regard to the respective types of dots undesirably increases the total volume of data output. Conversion to the dot number data of the respective types of dots significantly reduces the total volume of data output and thereby remarkably shortens the total time required for image output.

The positions of dot-on pixels in each pixel group are determined according to the dot number data of the respective types of dots and the specified priority order of individual pixels in the pixel group for dot formation. One preferable procedure determines the positions of dot-on pixels in each pixel group, based on a priority order selected for the pixel group among the stored multiple options for the priority order. Even when identical dot number data with regard to the respective types of dots are generated for a sequence of adjoining pixel groups, this technique enables dots to be created at different pixel positions in the respective pixel groups. This avoids dot formation in a distinct regular pattern and thereby prevents deterioration of the picture quality of a resulting image.

The image output control system of the invention may convert the dot number data of the respective types of dots to a preset code and output the preset code, instead of directly outputting the dot number data of the respective types of dots. One preferable procedure stores in advance a dot number combination mapping table that maps each combination of numbers of the multiple different types of dots to a preset code. The procedure refers to the dot number combination mapping table to convert a combination of the numbers of the respective types of dots determined with respect to a pixel group to a corresponding preset code and outputs the preset code to the image output device. The image output device stores in advance a code mapping table that maps each preset code to a combination of the numbers of the multiple different types of dots. The image output device receives the output preset code of the pixel group and refers to the code mapping table to reconvert the received preset code to the numbers of the respective types of dots.

Conversion to the preset code effectively reduces the data volume and ensures prompt data output, compared with output of the dot number data representing the numbers of dots to be created in each pixel group with regard to the multiple different types of dots. The method of outputting the preset code converted from the dot number data naturally requires both conversion of the combination of the numbers of the multiple different types of dots to the preset code and reconversion of the preset code to the combination of the numbers of the multiple different types of dots. Such conversion and reconversion is, however, quickly implemented by storing the conversion tables mapping the combination of the numbers of the respective types of dots to the preset code. The method of outputting the preset code converted from the dot number data of the respective types of dots thus desirably shortens the total time required for data output and thereby ensures prompt image output.

One preferable embodiment of the image output control system sequentially determines the positions of the dot-on pixels in each pixel group with respect to each type of dot in a descending order of the density per unit area of the multiple different types of dots.

The dots having the high density per unit area are visually conspicuous. The positions of the dot-on pixels where such dots of the high tone values are created should thus be determined to avoid localized dot formation. After the positions of dot-on pixels with regard to one type of dot have been determined, the procedure naturally omits these dot-on pixels from the object of determination of dot-on pixels with regard to another type of dot. This restricts subsequent determination of the positions of the dot-on pixels and may lead to localized formation of dots having the high tone values and deteriorate the picture quality of a resulting image. Sequential determination of the positions of the dot-on pixels in the descending order of the density per unit area, on the other hand, enables the pixel positions of the more conspicuous dot to be determined without restriction by the results of the other dots, thus ensuring the good picture quality of the resulting image.

In the image output control system and the image output control method of the invention, the following procedure may be adopted to determine the number of dots to be created in each pixel group with respect to each of the multiple different types of dots having different densities per unit area. The procedure stores in advance a threshold value group consisting of multiple threshold values, which respectively correspond to the predetermined number of multiple pixels included in the pixel group. The procedure generates first dot density data and second dot density data of each pixel group according to the image data. Here the first dot density data represents a density of a first dot, which has a highest density per unit area among the respective types of dots, to be created in the pixel group. The second dot density data represents a density of either of the first dot and a second dot, which has a second highest density per unit area among the respective types of dots, to be created in the pixel group. The procedure subsequently compares the first dot density data with the threshold values included in the threshold value group and sets the number of threshold values that are smaller than the first dot density data to the number of the first dots to be created in the pixel group. The procedure then compares the second dot density data with the threshold values included in the threshold value group and sets the number of the second dots to be created in the pixel group, based on the preset number of the first dots and the number of threshold values that are smaller than the second dot density data. Specifically the procedure compares the second dot density data with only threshold values that are greater than the first dot density data and counts the number of the threshold values that are smaller than the second dot density data.

The procedure of this embodiment determines the numbers of the respective types of dots by simple comparison of the first dot density data and the second dot density data with the threshold values. This arrangement facilitates determination of the numbers of dots to be created in each pixel group with regard to the respective types of dots. The second dot density data is greater than the first dot density data representing the density of formation of the first dot. It is thus apparent that the threshold values smaller than the first dot density data are also smaller than the second dot density data. The procedure accordingly determines the number of the second dots after determination of the number of the first dots and compares the second dot density data with only the threshold values greater than the first dot density data. This advantageously enables the number of the second dots to be determined within a short time period.

One specific procedure stores multiple different threshold value groups and selects one threshold value group with regard to each pixel group to determine the numbers of the respective types of dots to be created in the pixel group.

Application of different threshold value groups to identical dot density data may lead to determination of different numbers of dots. Selection of one threshold value group with regard to each pixel group to determine the numbers of the respective types of dots in the pixel group gives some variation to the determined numbers of the respective types of dots. This arrangement thus advantageously avoids formation of dots in a distinct regular pattern.

The procedure of this embodiment may store the multiple threshold values of the threshold value group in an order of magnitude of the respective threshold value in the threshold value group, and select the threshold values that are greater than the first dot density data, on the basis of the order of magnitude to determine the number of the second dots. For example, when the multiple threshold values are stored in an ascending order and there are N threshold values smaller than the first dot density data, the procedure compares the second dot density data with (N+1) and subsequent threshold values.

This arrangement facilitates selection of the threshold values to be compared with the second dot density data and thus desirably ensures simple and quick determination of the number of the second dots.

The image output control system of this embodiment may specify an ordinal number of a threshold value based on a most-recent setting of the number of the first dots and start comparison of the first dot density data from the threshold value of the specified ordinal number. When the determined number of the first dots is equal to M in a last-processed pixel group, the procedure starts comparison of the first dot density data from a threshold value having an ordinal number specified on the basis of the number M, for example, an M-th threshold value, an (M−1)-th threshold value, or an (M+1)-th threshold value.

In general, similar image data tend to be allocated to adjoining pixels, so that there is a high possibility that similar numbers of dots are to be created in adjoining pixel groups. Especially with regard to the first dot having the highest density per unit area, it is highly probable that identical numbers of dots are to be created in adjoining pixel groups. For example, in the case of determination that M first dots are to be created in one pixel group, it is highly probable that M first dots are also to be created in an adjoining pixel group. The preferable procedure accordingly specifies the ordinal number of the threshold value on the basis of the most-recent setting of the number of the first dots and starts the comparison of the first dot density data from the threshold value of the specified ordinal number. This arrangement determines the number of the threshold values smaller than the first dot density data by a small number of comparisons, thus ensuring quick determination of the number of the first dot to be created in the currently processed pixel group.

In the case of absence of any threshold value in the threshold value group that is smaller than the first dot density data, the image output control system of this embodiment may specify an ordinal number of a threshold value on the basis of a most-recent setting of the number of the second dots and start comparison of the second dot density data from the threshold value of the specified ordinal number.

As mentioned above, there is a high possibility that similar numbers of dots are to be created in adjoining pixel groups. When the number of the first dots and the number of the second dots to be created in one pixel group are respectively equal to 0 and M, it is highly probable that the required numbers of the first dots and the second dots are also equal to 0 and M in an adjoining pixel group. In the case of absence of any threshold value smaller than the first dot density data, the preferable procedure specifies the ordinal number of the threshold value on the basis of the most-recent setting of the number of the second dots and start comparison of the second dot density data from the threshold value of the specified ordinal number. This arrangement desirably determines the number of the second dots by a small number of comparisons.

In order to attain the above and the other related objects, the present invention is also directed to an image output device that receives processed image data, which has gone through a preset series of image processing, and creates multiple different types of dots having different densities per unit area according to the received image data, so as to output an image. The image output device includes: a number data receiving module that receives dot number data of each pixel group representing a number of dots to be created in the pixel group with respect to each of the multiple different types of dots, as the image data, where each pixel group is set to have a predetermined number of multiple pixels included in the image; a priority order specification module that specifies a priority order of individual pixels in the pixel group for dot creation; a pixel position determination module that determines positions of dot-on pixels in the pixel group with respect to each type of dot, based on the dot number data of the pixel group with respect to each type of dot and the specified priority order; and a dot formation module that creates the multiple different types of dots at the determined positions of the dot-on pixels on an output medium.

There is an image output method corresponding to the image output device described above. Another application of the present invention is accordingly an image output method that creates multiple different types of dots having different densities per unit area according to processed image data, which has gone through a preset series of image processing, so as to output an image. The image output method includes the steps of: (A) receiving dot number data of each pixel group representing a number of dots to be created in the pixel group with respect to each of the multiple different types of dots, as the image data, where each pixel group is set to have a predetermined number of multiple pixels included in the image; (B) specifying a priority order of individual pixels in the pixel group for dot creation; (C) determining positions of dot-on pixels in the pixel group with respect to each type of dot, based on the dot number data of the pixel group with respect to each type of dot and the specified priority order; and (D) creating the multiple different types of dots at the determined positions of the dot-on pixels on an output medium.

The image output device and the corresponding image output method of the invention receive the dot number data representing the numbers of dots to be created in each pixel group with regard to the multiple different types of dots. The image output device and the corresponding image output method of the invention determine the positions of dot-on pixels, where the respective types of dots are to be created, in the pixel group according to the dot number data, and create the respective types of dots at the determined positions of the dot-on pixels, so as to output a resulting image.

As described above, the dot number data representing the number of dots to be created in each pixel group occupies a significantly smaller data capacity, compared with the data representing the dot on-off state of individual pixels included in the pixel group. Especially in the case of creation of multiple different types of dots, the volume of the data representing the numbers of the respective types of dots is significantly smaller than the volume of the data representing the dot on-off state of the respective types of dots. Even when an object image has a large number of pixels, output of an image according to the received dot number data with regard to the respective types of dots ensures quick data input and thereby prompt image output.

The priority order of individual pixels used for determination of the dot-on pixel positions is selected for each pixel group. Even when identical dot number data with regard to the respective types of dots are generated for a sequence of adjoining pixel groups, this technique determines different pixel positions for dot formation in the respective pixel groups. This effectively avoids dot formation in a distinct regular pattern and thereby prevents deterioration of the picture quality of a resulting image.

The image output device may receive a converted preset code, instead of directly receiving the dot number data of the respective types of dots. The image output device stores in advance a code mapping table that maps each preset code to a combination of the numbers of the multiple different types of dots. The image output device receives a preset code, which is obtained by converting a combination of the numbers of the respective types of dots to be created in each pixel group, as image data and refers to the code mapping table to reconvert the received image data to the numbers of the respective types of dots.

As mentioned previously, the received data volume of a preset code for each pixel group is significantly less than the received data volume of the numbers of the respective types of dots to be created in the pixel group. This arrangement advantageously ensures quick data input and thereby prompt image output.

One preferable embodiment of the image output device sequentially determines the positions of the dot-on pixels in each pixel group with respect to each type of dot in a descending order of the density per unit area of the multiple different types of dots.

As described above, the dots having the high density per unit area are visually conspicuous. The positions of the dot-on pixels where such dots are created should thus be determined to avoid localized dot formation. Sequential determination of the positions of the dot-on pixels in the descending order of the density per unit area enables the pixel positions of the more conspicuous dot to be determined without restriction by the results of the other dots, thus ensuring the good picture quality of the resulting image.

In order to attain the above and the other related objects, the present invention is further directed to an image processing device that causes input image data representing an image to go through a preset series of image processing and thereby generates control data, the control data being supplied to an image output device and used for control of dot formation by the image output device, which creates multiple different types of dots having different densities per unit area and outputs a resulting processed image. The image processing device includes: a dot number determination module that determines a number of dots to be created in each pixel group, which is set to have a predetermined number of multiple pixels included in the image, with respect to each of the multiple different types of dots according to the image data; and a control data output module that outputs dot number data of the pixel group, which represents the determined number of dots to be created in the pixel group with respect to each type of dot, as the control data to the image output device.

There is an image processing method corresponding to the image processing device described above. Another application of the present invention is accordingly an image processing method that causes input image data representing an image to go through a preset series of image processing and thereby generates control data, the control data being supplied to an image output device and used for control of dot formation by the image output device, which creates multiple different types of dots having different densities per unit area and outputs a resulting processed image. The image processing method includes the steps of (a) determining a number of dots to be created in each pixel group, which is set to have a predetermined number of multiple pixels included in the image, with respect to each of the multiple different types of dots according to the image data; and (b) outputting dot number data of the pixel group, which represents the determined number of dots to be created in the pixel group with respect to each type of dot, as the control data to the image output device.

The image processing device and the corresponding image processing method of the invention determine the numbers of the multiple different types of dots to be created in each pixel group, which is set to have a predetermined number of multiple pixels. The dot number data representing the determined numbers of the respective types of dots are output to the image output device.

As described above, the dot number data representing the number of dots to be created in each pixel group occupies a significantly smaller data capacity, compared with the data representing the dot on-off state of individual pixels included in the pixel group. Conversion of the image data to the dot number data of respective pixel groups thus advantageously enables the control data to be output to the image output device within a short time period and thereby ensures prompt image output.

One preferable embodiment of the image processing device converts the dot number data representing the numbers of the respective types of dots to a preset code, prior to output to the image output device.

The output data volume of a preset code is significantly less than the output data volume of the numbers of the respective types of dots. The method of converting the dot number data to the preset code as the control data desirably enables the control data to be output to the image output device within a short time period and thereby ensures prompt image output.

In the image processing device of the invention, the following procedure may be adopted to determine the number of dots to be created in each pixel group with respect to each of the multiple different types of dots having different densities per unit area. The procedure stores in advance a threshold value group consisting of multiple threshold values, which respectively correspond to the predetermined number of multiple pixels included in the pixel group. The procedure generates first dot density data and second dot density data of each pixel group according to the image data. Here the first dot density data represents a density of a first dot, which has a highest density per unit area among the respective types of dots, to be created in the pixel group. The second dot density data represents a density of either of the first dot and a second dot, which has a second highest density per unit area among the respective types of dots, to be created in the pixel group. The procedure sets the number of the threshold values smaller than the first dot density data, among the threshold values included in the threshold value group, to the number of the first dots to be created in the pixel group. The procedure then specifies the number of the threshold values smaller than the second dot density data, among the threshold values included in the threshold value group, and determines the number of the second dots to be created in the pixel group, based on the specified number of the threshold values and the number of the first dots. Specifically the procedure compares the second dot density data with only threshold values that are greater than the first dot density data and counts the number of the threshold values that are smaller than the second dot density data.

The second dot density data is greater than the first dot density data representing the density of formation of the first dot. It is thus apparent that the threshold values smaller than the first dot density data are also smaller than the second dot density data. The procedure accordingly determines the number of the second dots after determination of the number of the first dots and compares the second dot density data with only the threshold values greater than the first dot density data. This advantageously enables the number of the second dots to be determined within a short time period.

The technique of the invention is actualized by diversity of other applications, which include programs that are executed by a computer to attain the image output control method, the image output method, and the image processing method described above, and recording media in which such programs are recorded.

The computer reads any of such programs, which may be recorded in the recording media, to attain the various functions described above. This ensures prompt image output even when an object image has a large number of pixels.

BRIEF DESCRIPTION OF THE DRAWINGS

FIGS. 6(a) and 6(b) show resolution conversion of image data;

FIGS. 13(a) through 13(c) show a process of generating dot number data in a number data generation process of a first modified example of the first embodiment;

FIGS. 16(a) and 16(b) show replacement of tone values of individual pixels included in one pixel group with a mean tone value according to the presence or the absence of an edge in the pixel group;

FIGS. 17(a) through 17(c) show data formats output from the computer in the second embodiment;

FIG. 18 shows another data format output from the computer in the second embodiment;

FIGS. 22(a) and 22(b) show a process of generating dot number data from dot density data in a number data generation process of the third embodiment;

FIG. 23 is a flowchart showing the details of the number data generation process executed in the third embodiment;

FIG. 25 conceptually shows a conversion table referred to for encoding dot number data of the respective size dots;

FIG. 33 conceptually shows a decoding table referred to in the pixel position determination process of the third embodiment;

BEST MODES OF CARRYING OUT THE INVENTION

Figure 1:
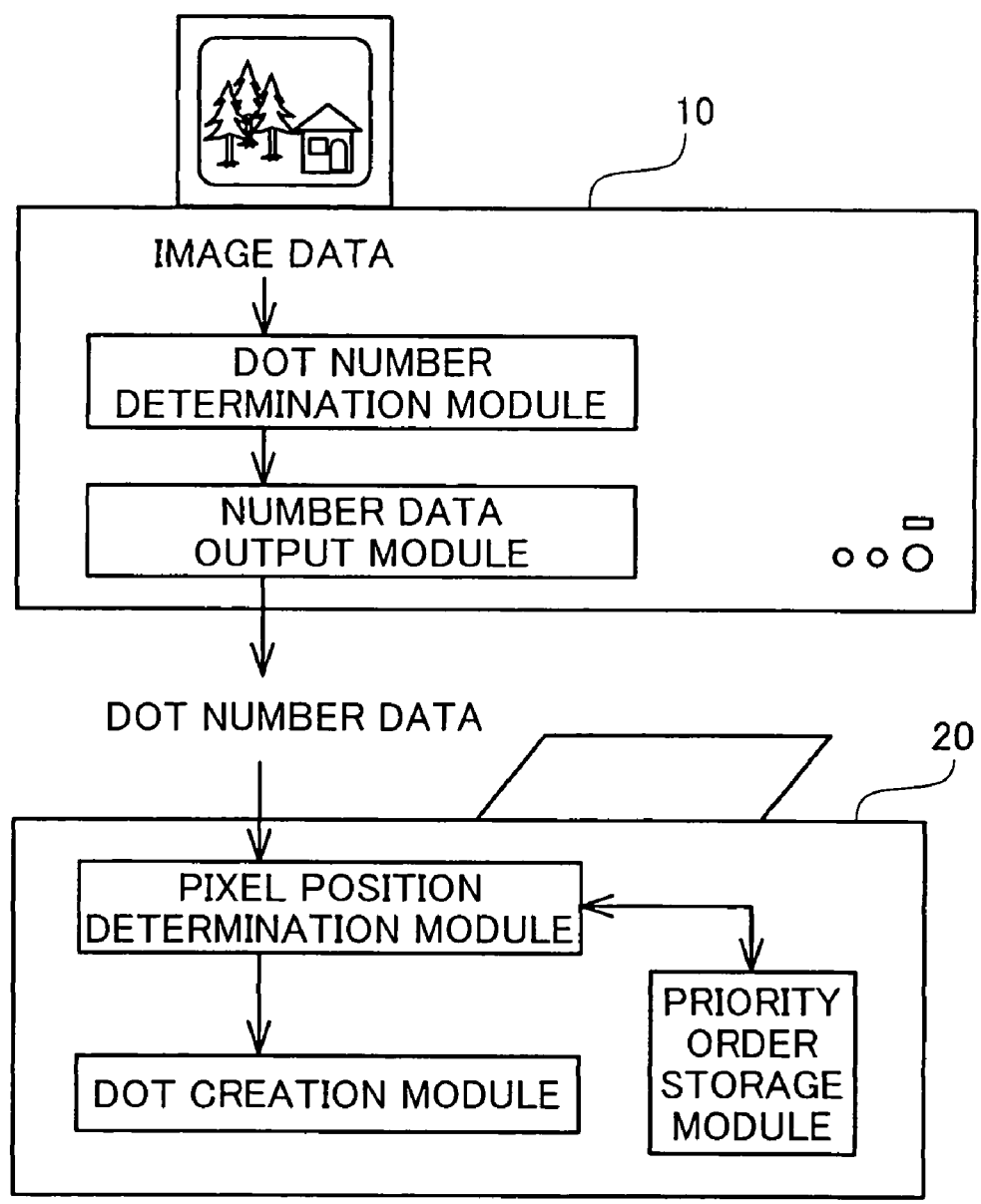
FIG. 1 schematically illustrates a printing system to explain the general outline of the invention.
Figure 2:
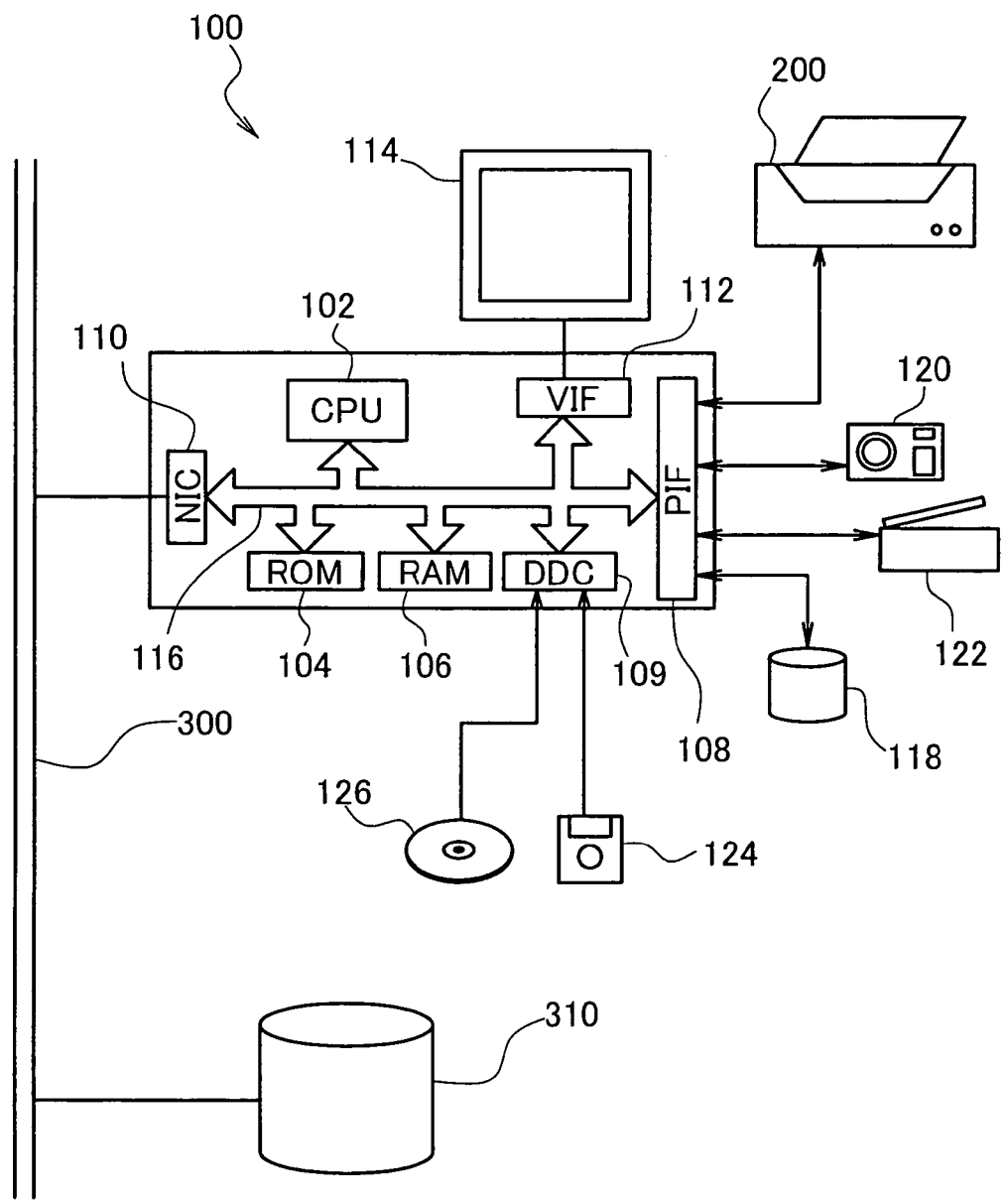
FIG. 2 illustrates the configuration of a computer as an image processing device of an embodiment.
Figure 3:
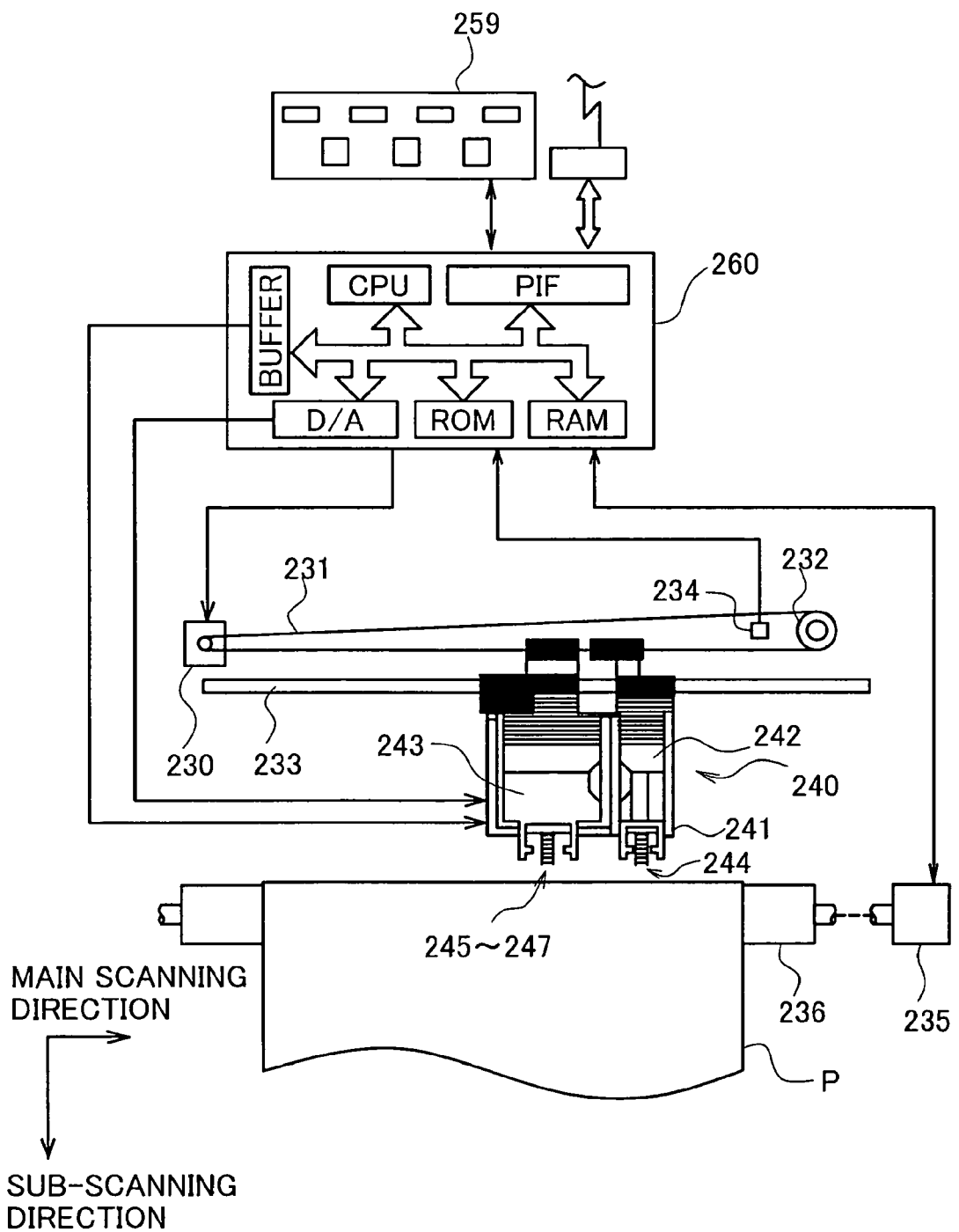
FIG. 3 schematically illustrates the structure of a printer as an image output device of the embodiment.
Figure 4:
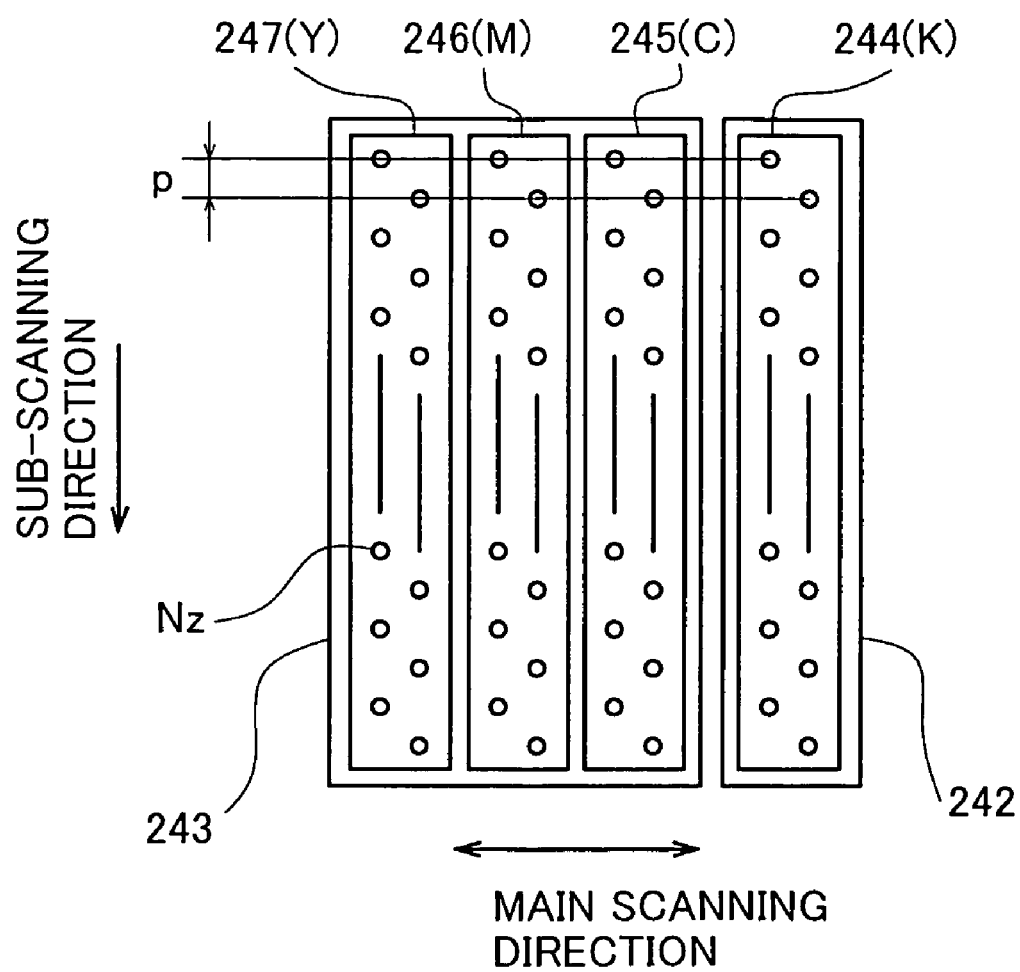
FIG. 4 shows an arrangement of nozzles Nz on respective ink ejection heads.
Figure 5:
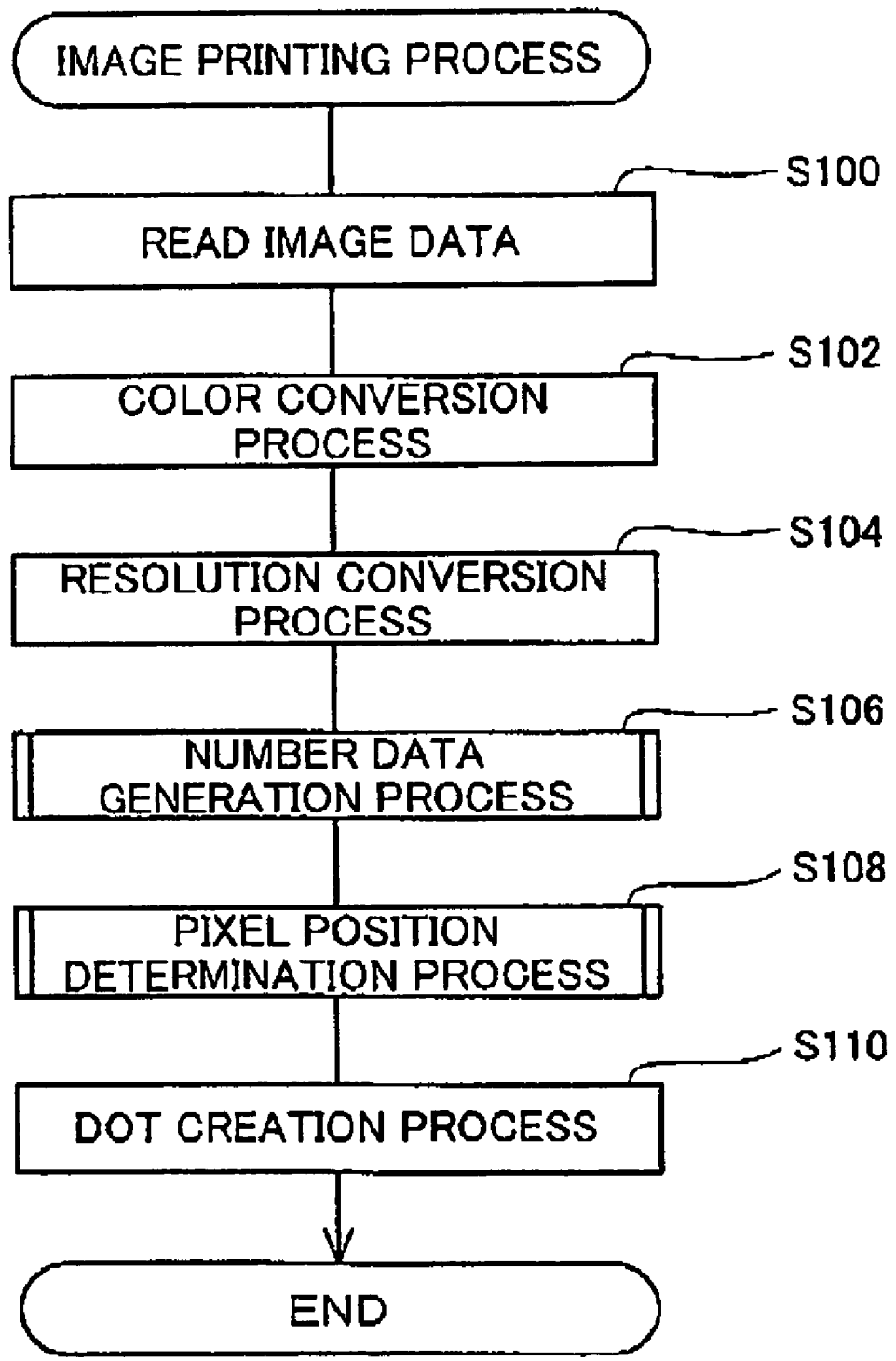
FIG. 5 is a flowchart showing an image printing process executed by the image processing device of a first embodiment.
Figure 7:
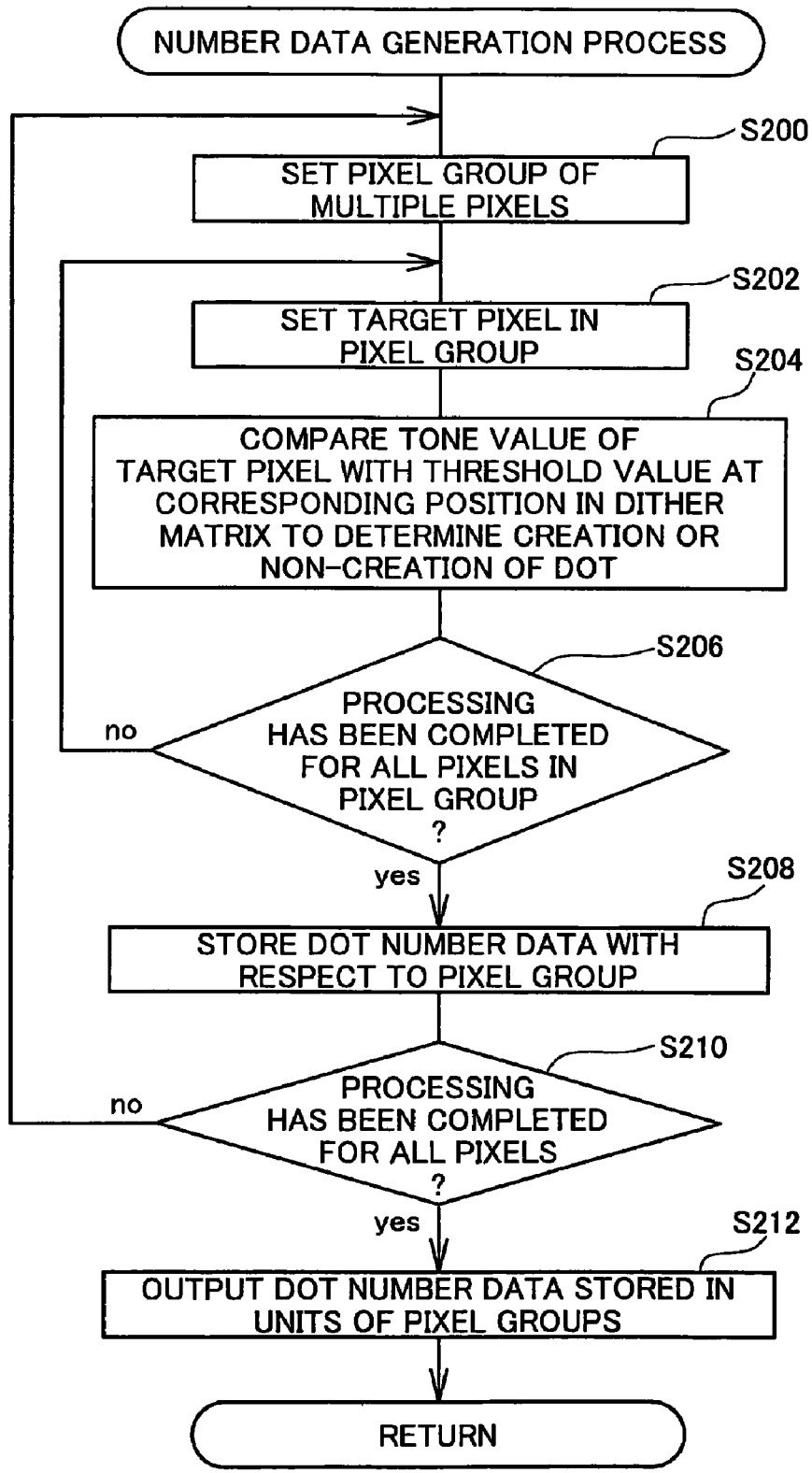
FIG. 7 is a flowchart showing the details of a number data generation process executed in the first embodiment.
Figure 8:
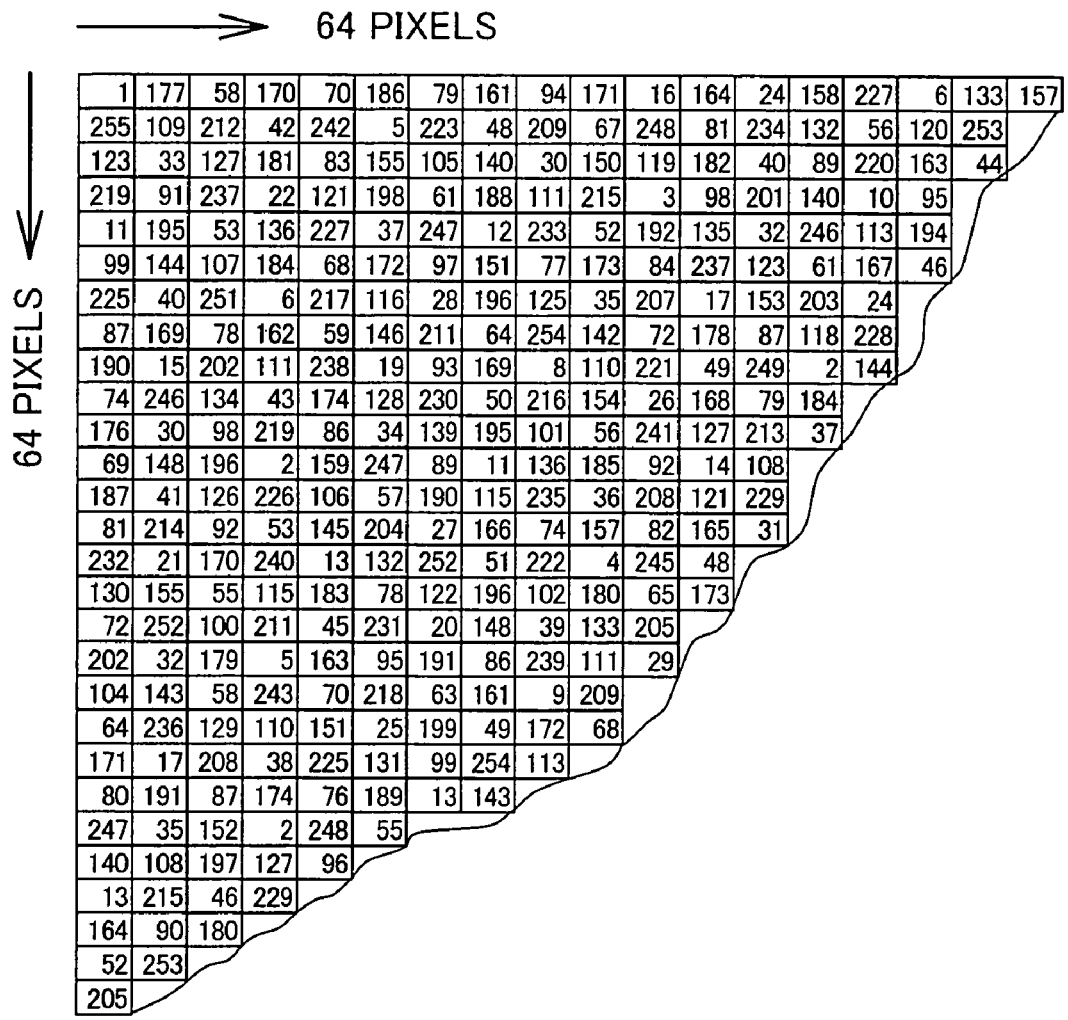
FIG. 8 shows part of a dither matrix.
Figure 9:
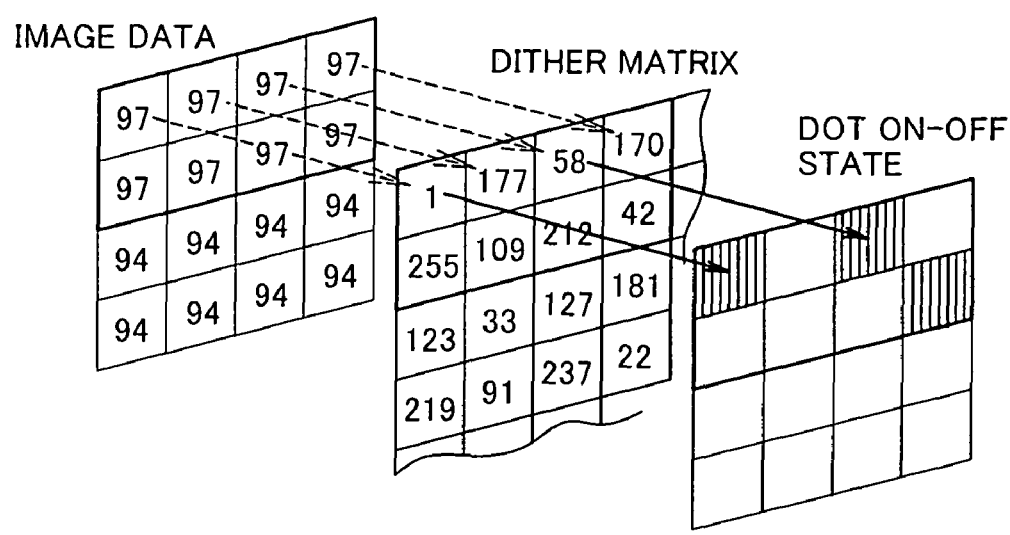
FIG. 9 shows a process of determining dot on-off state of individual pixels by referring to the dither matrix.
Figure 10A:
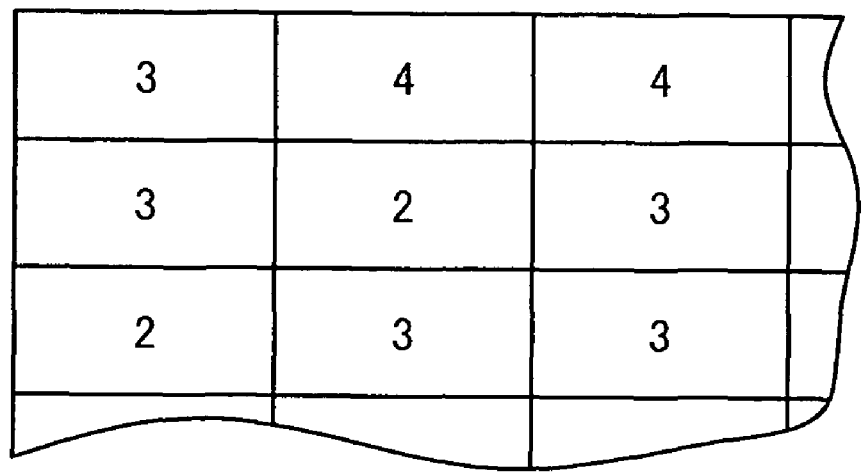
FIGS. 10(a) and 10(b) conceptually show a process of generating dot number data with regard to each pixel group.
Figure 10B:
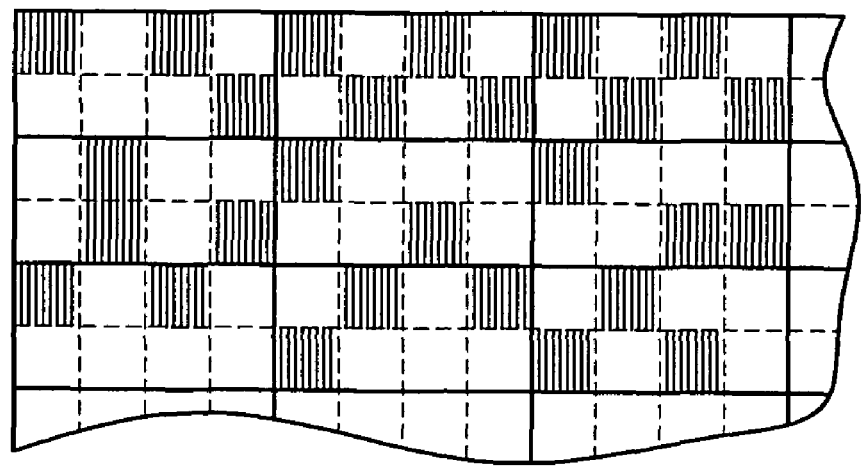
Figure 11:
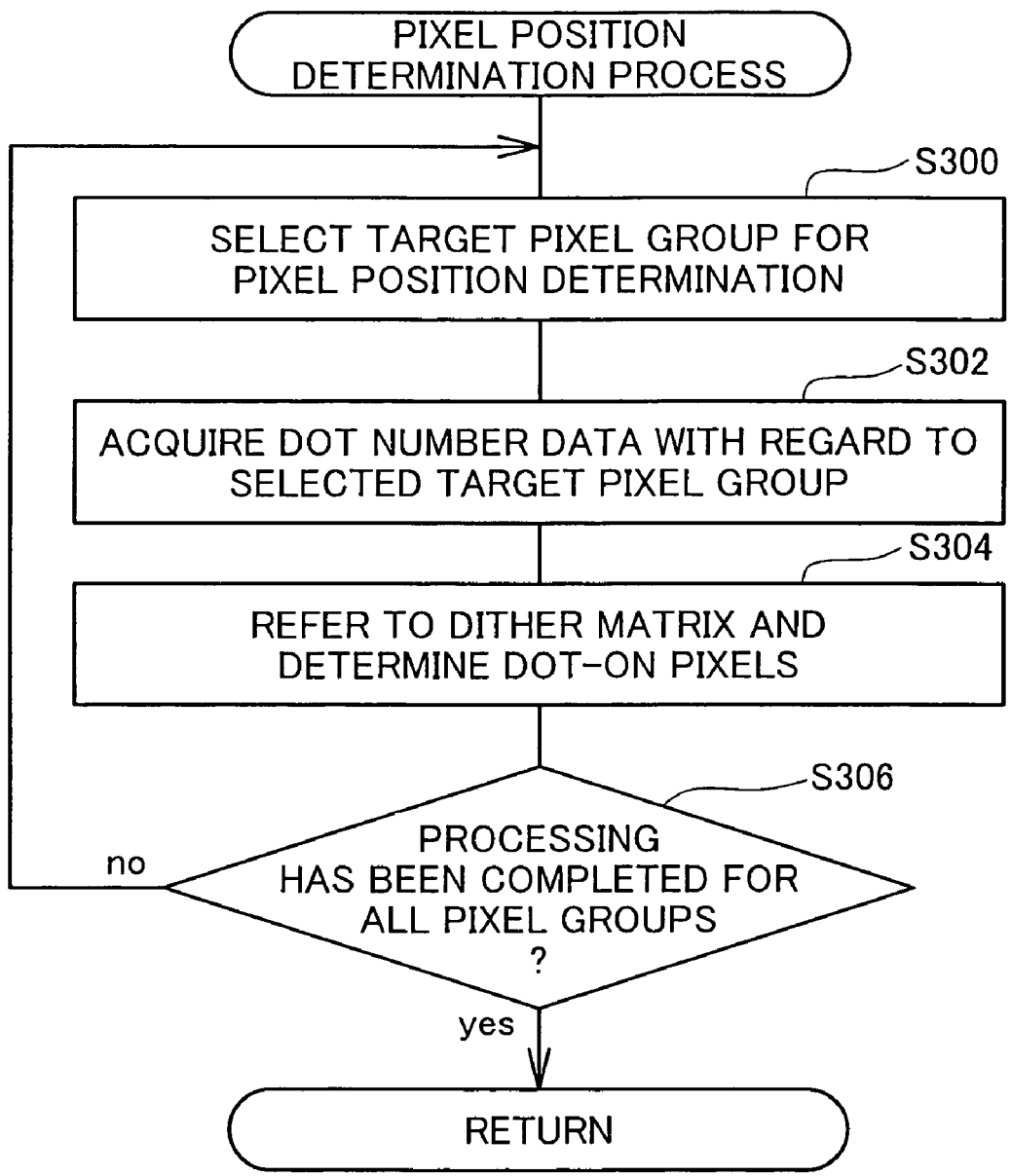
FIG. 11 is a flowchart showing the details of a pixel position determination process executed in the first embodiment.
Figures 12A, 12B, 12C, 12D:
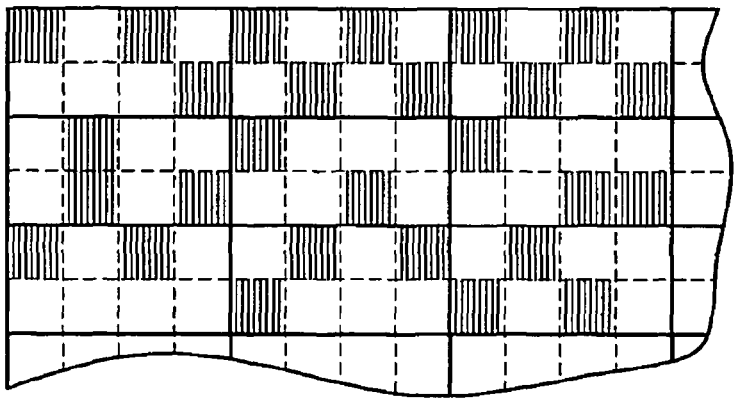
FIGS. 12(a) through 12(d) show a process of determining the positions of dot-on pixels according to the dot number data in the pixel position determination process of the first embodiment.
Figures 14A, 14B, 14C:
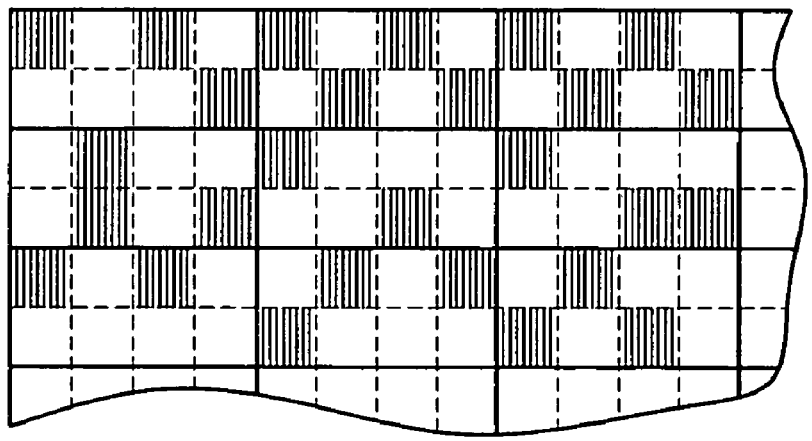
FIGS. 14(a) through 14(c) show a process of determining the positions of dot-on pixels according to the dot number data in a pixel position determination process of a second modified example of the first embodiment.
Figure 15:
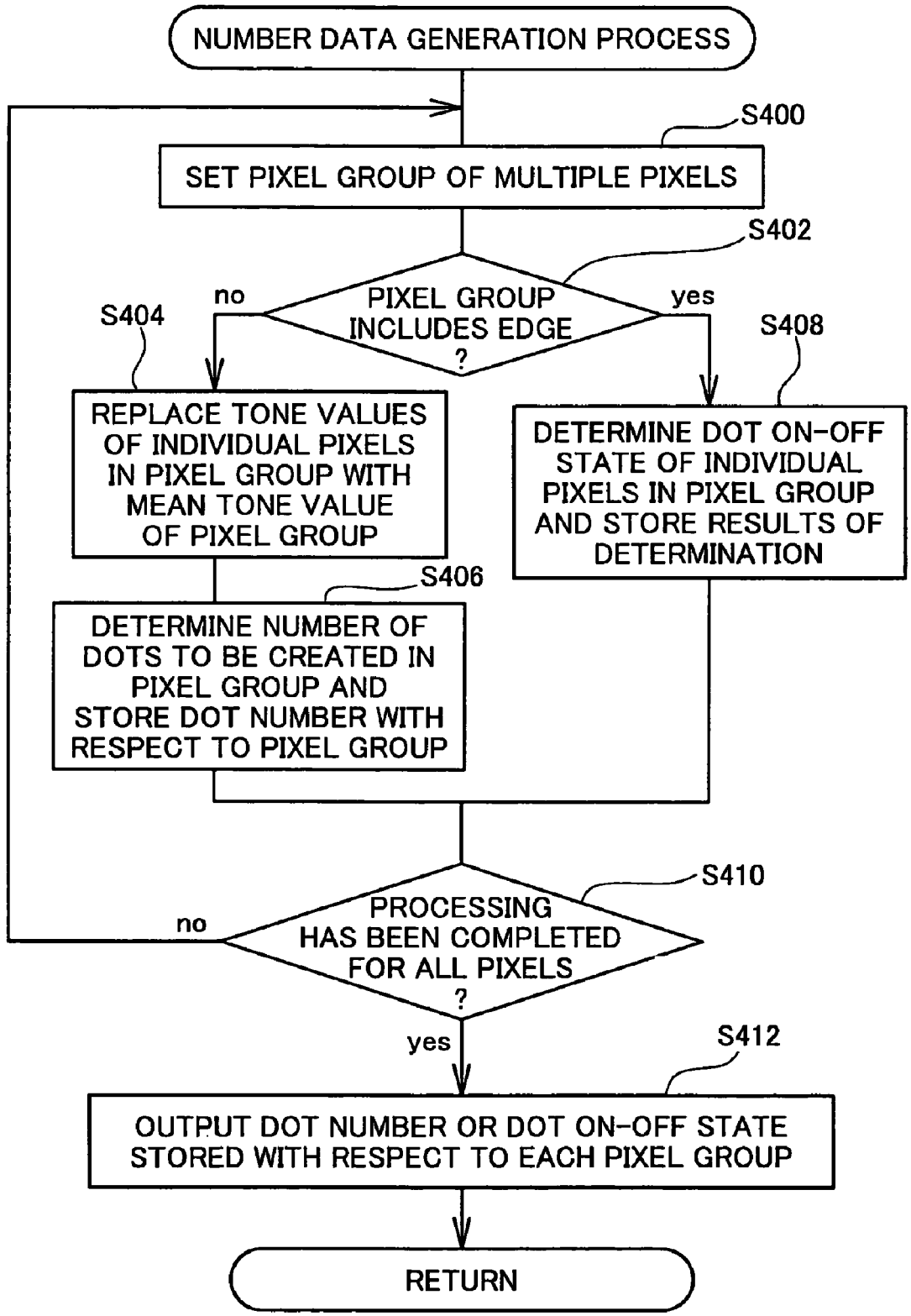
FIG. 15 is a flowchart showing the details of a number data generation process executed in a second embodiment.
Figure 19:
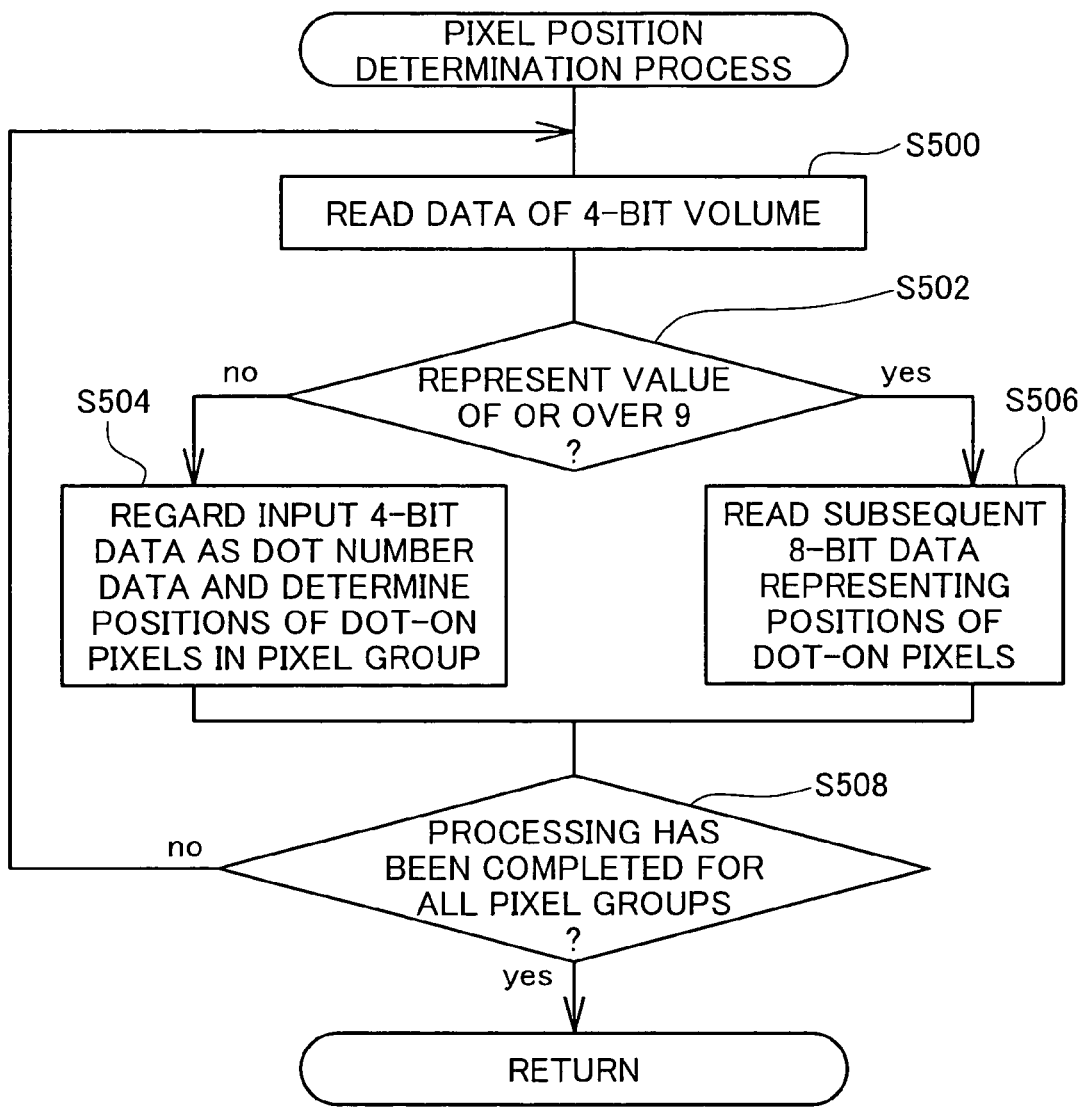
FIG. 19 is a flowchart showing the details of a pixel position determination process executed in the second embodiment.
Figure 20:
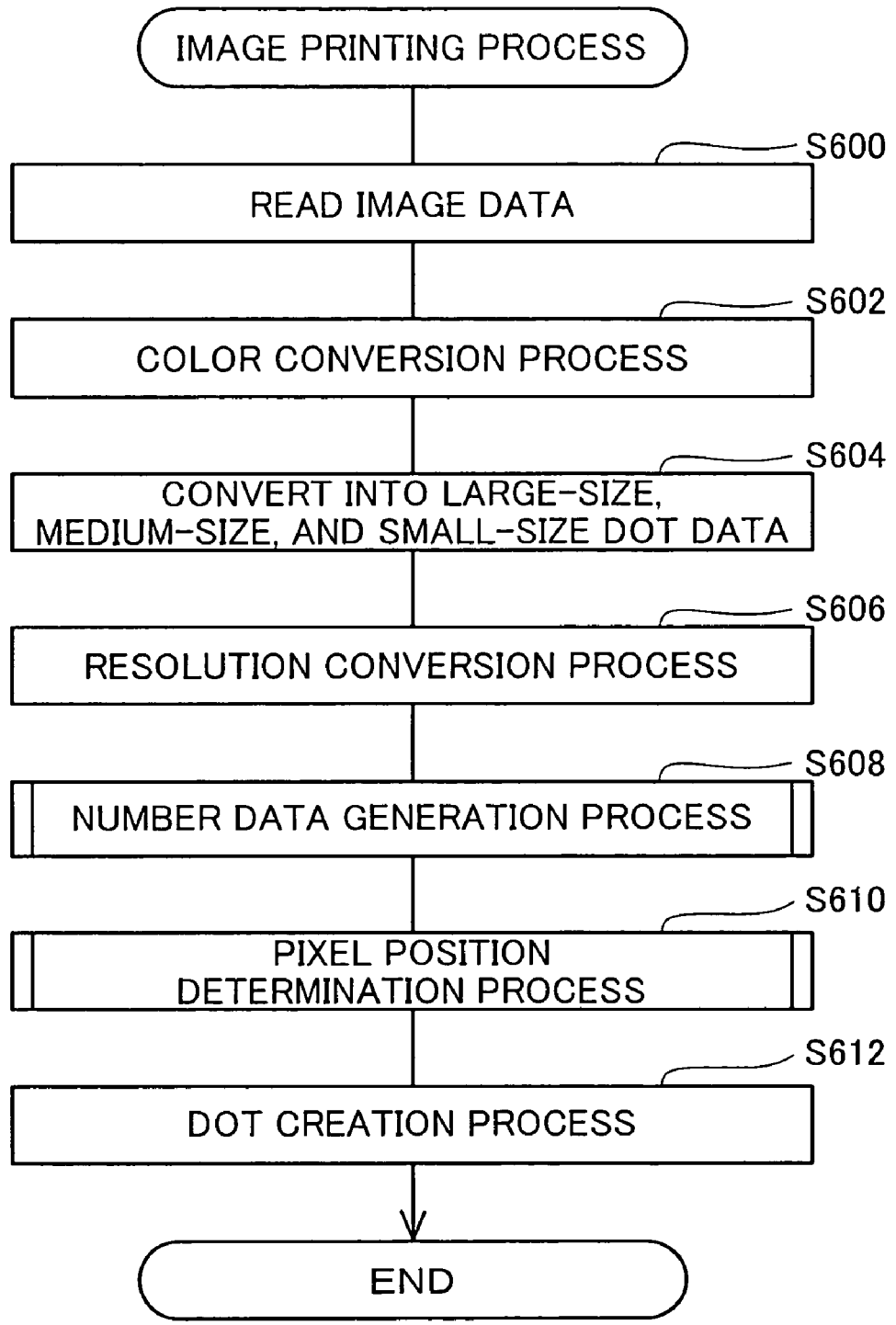
FIG. 20 is a flowchart showing an image printing process executed in a third embodiment.
Figure 21:
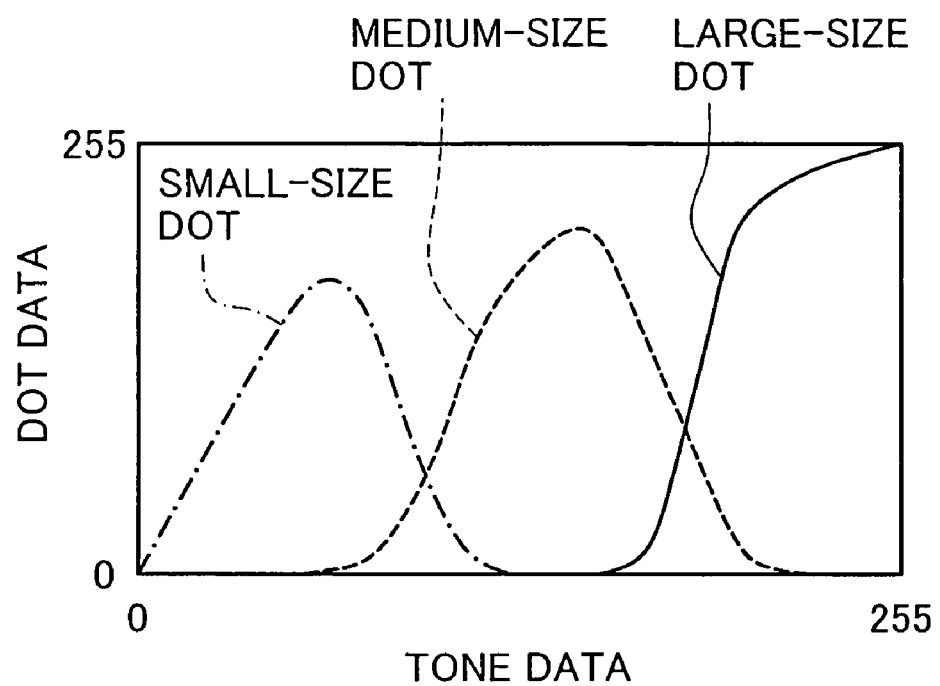
FIG. 21 conceptually shows a conversion table referred to in a conversion process to large-size, medium-size, and small-size dot density data in the third embodiment.
Figure 24:
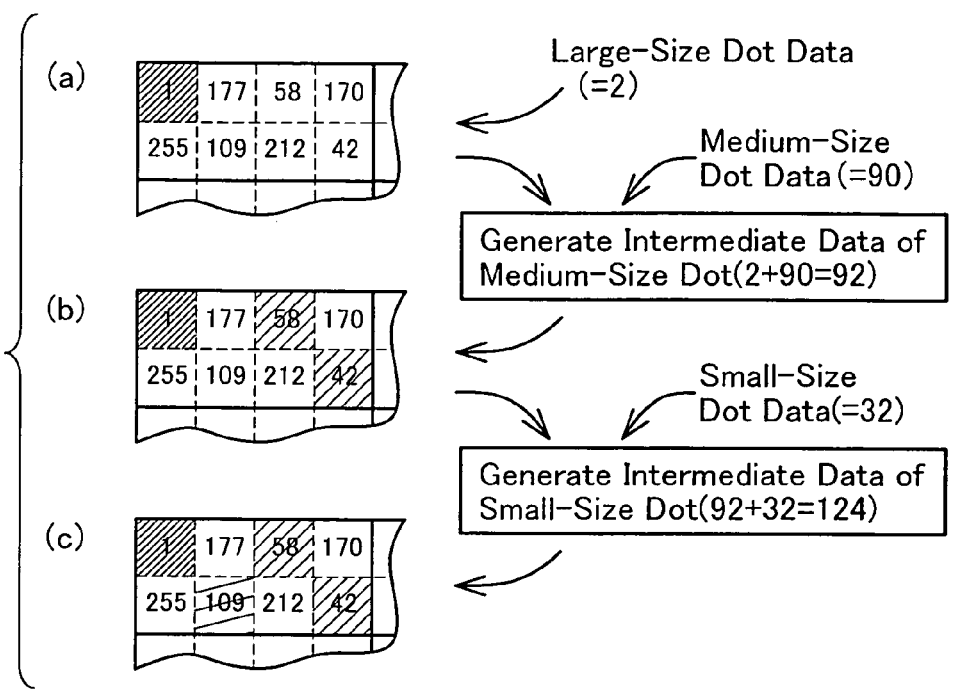
FIG. 24 shows a process of determining the positions of dot-on pixels of respective size dots by referring to the dither matrix.

Some modes of carrying out the invention are discussed below as preferred embodiments in the following sequence to describe the objects, features, aspects, and advantages of the present invention more apparently.

A. General Outline of Embodiments
B. First Embodiment
    B-1. System Configuration
    B-2. Schema of Image Printing Process
    B-3. Number Data Generation Process in First Embodiment
    B-4. Pixel Position Determination Process in First Embodiment
    B-5. Modified Examples of First Embodiment
C. Second Embodiment
    C-1. Number Data Generation Process in Second Embodiment
    C-2. Pixel Position Determination Process in Second Embodiment
D. Third Embodiment
    D-1. Schema of Image Printing Process in Third Embodiment
    D-2. Number Data Generation Process in Third Embodiment
    D-3. Pixel Position Determination Process in Third Embodiment
    D-4. Modified Examples of Third Embodiment
E. Modifications FIG. 22 shows a process of generating dot number data from dot density data according to the number data generation process of the third embodiment. FIG. 22(a) shows settings of dot density data with regard to the large-size, medium-size, and small-size dots to the individual pixels included in each pixel group. Each solid rectangle represents one pixel group. Each pixel group includes a predetermined number of multiple pixels, and dot density data are actually set to each of the multiple pixels. For the graphic simplicity, however, the individual pixels are omitted from the illustration, and the dot density data are set to each pixel group in the illustration. For example, the expression of Data(L,M,S)=(2, 90,32) in a pixel group on the upper left corner of FIG. 22(a) means that the large-size dot density data '2', the medium-size dot density data '90', and the small-size dot density data '32' are set to the individual pixels included in this pixel group. As mentioned above in relation to the first embodiment, when all the pixels included in each pixel group have an identical tone value, the resolution conversion process may be omitted and the number data generation process may take charge of the substantial resolution conversion.

The number data generation process of the third embodiment processes the dot density data with regard to the respective size dots and generates dot number data as shown in FIG. 22(b). As in the representation of FIG. 22(a), each solid rectangle in FIG. 22(b) represents a pixel group, which includes a predetermined number of multiple pixels. The individual pixels are omitted from the illustration, and the dot number data are generated with respect to each pixel group. For example, the expression of Dot(L,M,S)=(1,2,1) in the pixel group on the upper left corner of FIG. 22(b) means that the dot number data '1', '2', and '1' are generated respectively as the dot numbers of the large-size dot, the medium-size dot, and the small-size dot to be created in this pixel group. The details of the number data generation process of the third embodiment will be discussed later.

D-4. MODIFIED EXAMPLES OF THIRD EMBODIMENT

The number data generation process of the third embodiment described above may be modified in various ways. Some examples of possible modification are discussed below.

(1) First Modified Example

Figure 26:
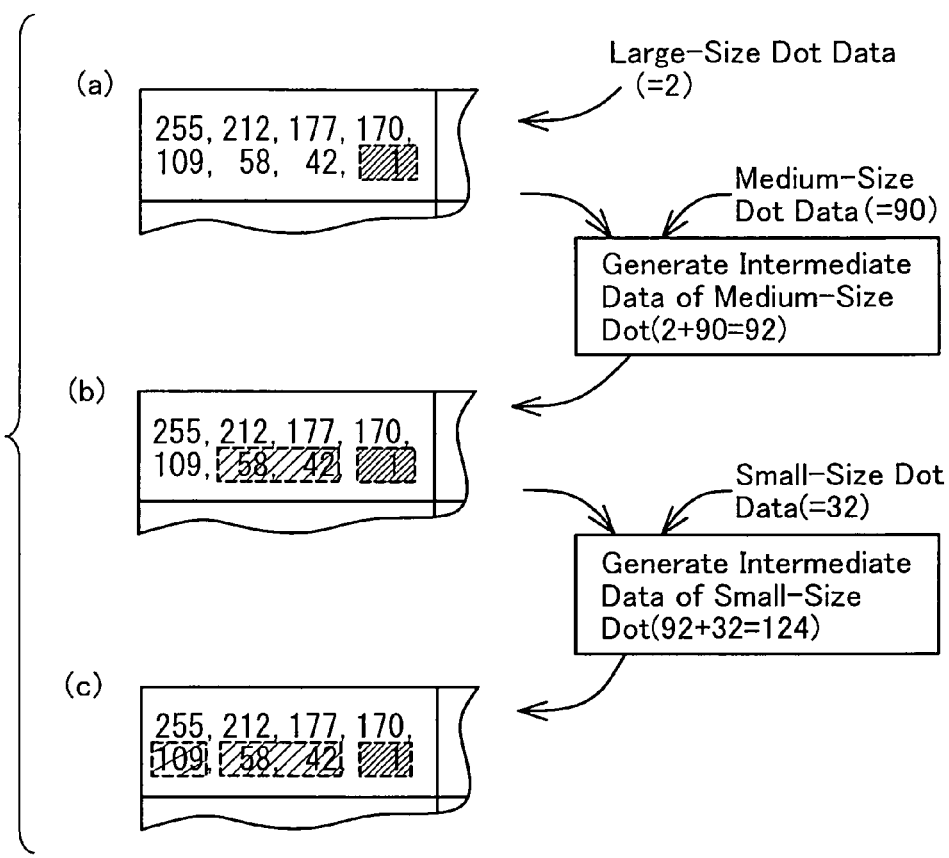
FIG. 26 conceptually shows a process of determining the numbers of the respective size dots without specification of pixel positions in the number data generation process of the third embodiment.

The number data generation process of the third embodiment discussed above determines the dot on-off state of the respective size dots with specification of pixel positions. The information on specification of pixel positions is, however, omitted from the transferred data, and only the information on the numbers of the respective size dots to be created in each pixel group is transferred to the printer 200. In view of such omission, the number data generation process may determine the numbers of the respective size dots without specification of pixels positions, like the first modified example of the first embodiment described above (see FIG. 13). FIG. 26 conceptually shows a process of determining the numbers of the respective size dots without specification of pixel positions.

(2) Second Modified Example

When each set of multiple threshold values is stored in combination with information representing the order of the magnitude of the respective threshold values as in the first modified example described above, the procedure may compare the dot density data of the large-size dot or the intermediate data of the medium-size dot with the threshold values as discussed below to determine the numbers of the respective size dots within a shorter time period. This procedure is described below as a second modified example.

Figure 27:
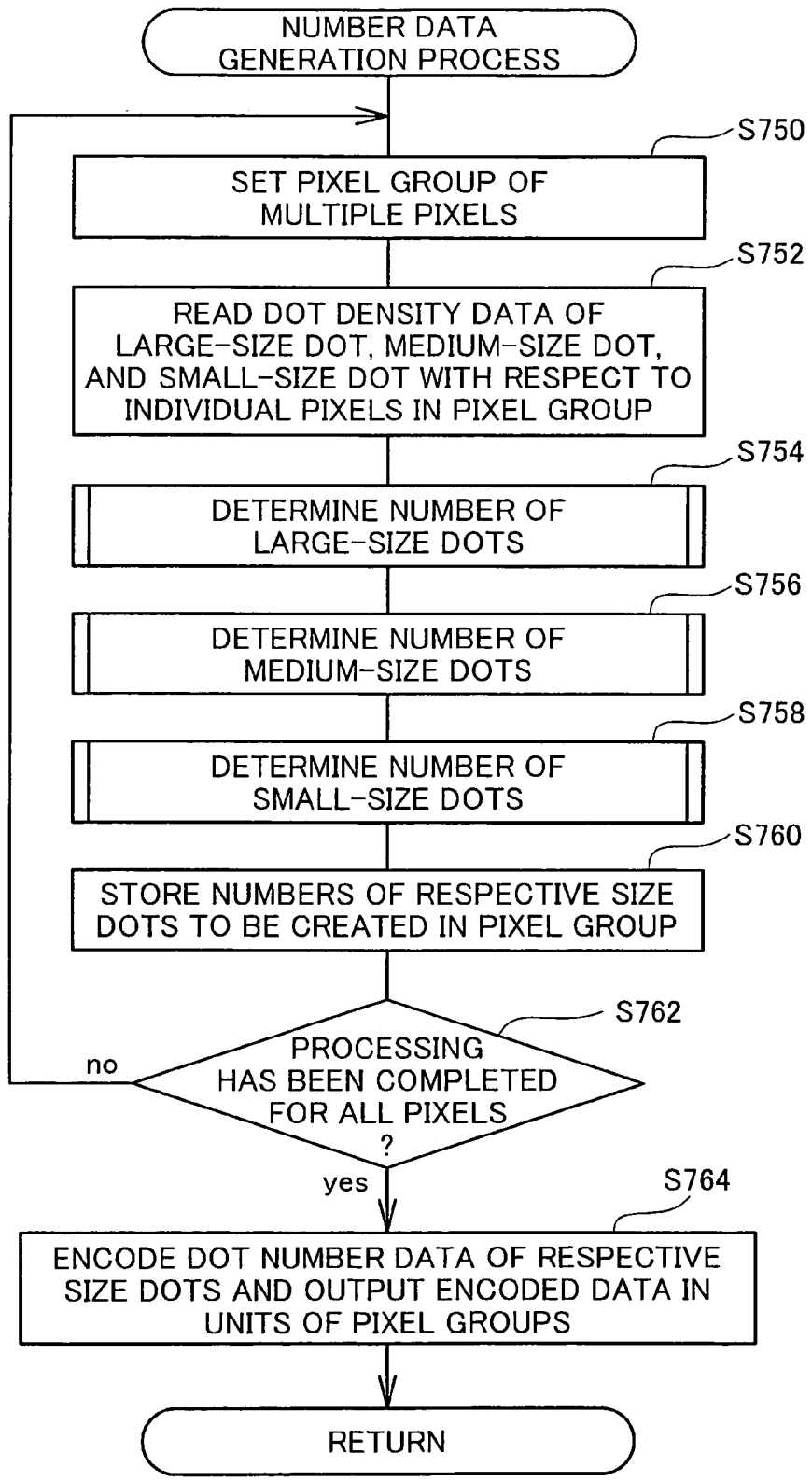
FIG. 27 is a flowchart showing the details of a number data generation process executed in a second modified example of the third embodiment.

FIG. 27 is a flowchart showing the details of a number data generation process executed in the second modified example of the third embodiment. The number data generation process of the second modified example first sets a pixel group having a predetermined number of multiple pixels (step S750) and reads dot density data of the large-size dot, the medium-size dot, and the small-size dot with respect to the individual pixels in the pixel group (step S752). Like the third embodiment discussed above, the individual pixels of each pixel group have identical dot density data. The process may thus read the dot density data of only one pixel in the pixel group, instead of reading the dot density data of all the individual pixels in the pixel group.

After reading the dot density data of the large-size dot, the medium-size dot, and the small-size dot, the process successively determines the number of the large-size dots to be created in the pixel group (step S754), the number of the medium-size dots to be created in the pixel group (step S756), and the number of the small-size dots to be created in the pixel group (step S758). The procedure of the second modified example adopts processes discussed below in detail to determine the numbers of the respective size dots promptly.

After determination of the numbers of the large-size dots, the medium-size dots, and the small-size dots, the process stores the numbers of the respective size dots to be created in the pixel group (step S760), and determines whether the processing has been completed with regard to all the pixels included in the input image data (step S762). When there is any unprocessed pixel (step S762: No), the process returns to step S750 to set a next pixel group and repeats the above series of processing. When the processing has been completed with regard to all the pixels included in the input image data (step S762: Yes), the process encodes the numbers of the respective size dots stored in units of pixel groups and outputs the encoded data to the printer 200 (step S764). The method of encoding the numbers of the respective size dots is identical with that of the third embodiment discussed above and is thus not specifically described here.

Figure 28:
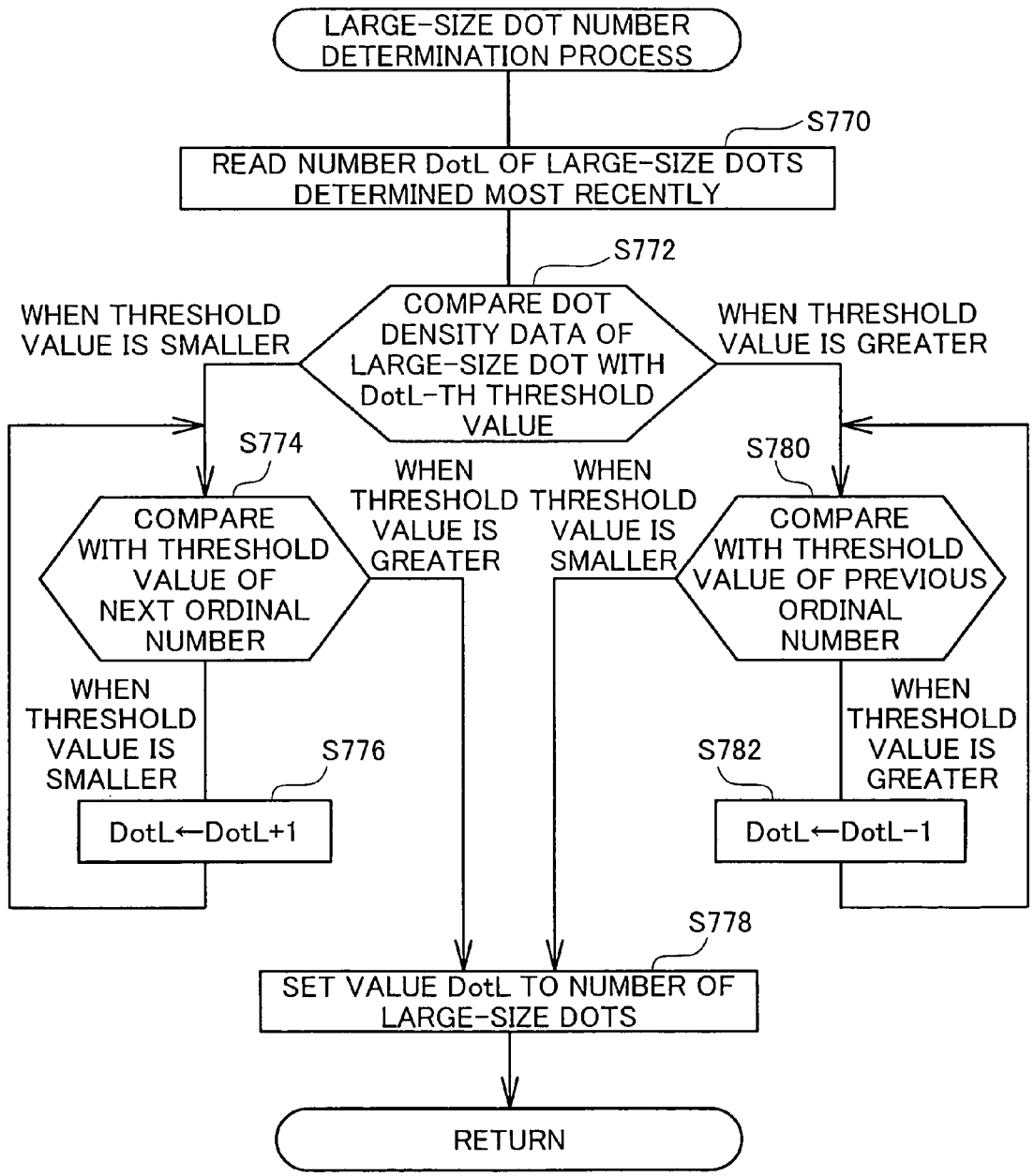
FIG. 28 is a flowchart showing the details of a process of determining the number of large-size dots executed in the second modified example of the third embodiment.

The processes of determining the numbers of the large-size dots, the medium-size dots, and the small-size dots are described sequentially. FIG. 28 is a flowchart showing the details of the large-size dot number determination process. In the second modified example of the third embodiment, the large-size dot number determination process first reads a number DotL of the large-size dots determined in its most recent cycle, that is, the number of the large-size dots to be created in a last processed pixel group, among the pixel groups processed for dot number determination (step S770).

The process compares the input dot density data of the large-size dot with a threshold value of a DotL-th ordinal number (in an ascending order) among a set of threshold values mapped to the currently processed pixel group (step S772). When it is determined that the DotL-th threshold value is smaller than the dot density data of the large-size dot, the process subsequently compares the dot density data of the large-size dot with a threshold value of a next ordinal number, that is, with a threshold value of a (DotL+1)-th ordinal number (step S774). In this example, multiple threshold values included in one set are arranged in the ascending order. The (DotL+1)-th threshold value is thus larger than the DotL-th threshold value. When it is determined that the threshold value of the next ordinal number is still smaller than the dot density data of the large-size dot, the process increments the value DotL by one (step S776) and returns to step S774 to compare the dot density data of the large-size dot with a threshold value of a further next ordinal number, that is, with a threshold value of a (DotL+2)-th ordinal number. In this manner, the dot density data of the large-size dot is successively compared with threshold values of the increasing ordinal numbers. When the threshold value eventually becomes greater than the dot density data of the large-size dot, the value DotL at that moment is set to the number of the large-size dots to be created in the currently processed pixel group (step S778).

When it is determined at step S772 that the threshold value of the DotL-th ordinal number is greater than the dot density data of the large-size dot, on the other hand, the process subsequently compares the dot density data of the large-size dot with a threshold value of a previous ordinal number, that is, with a threshold value of a (DotL−1)-th ordinal number (step S780). The threshold value of the previous ordinal number is smaller than the current threshold value. When it is determined that the threshold value of the previous ordinal number is still greater than the dot density data of the large-size dot, the process decrements the value DotL by one (step S782) and returns to step S780 to compare the dot density data of the large-size dot with a threshold value of a further previous ordinal number, that is, with a threshold value of a (DotL−2)-th ordinal number. In this manner, the dot density data of the large-size dot is successively compared with threshold values of the decreasing ordinal numbers. When the threshold value eventually becomes smaller than the dot density data of the large-size dot, the value DotL at that moment is set to the number of the large-size dots to be created in the currently processed pixel group (step S778). After determination of the number of the large-size dots, the routine terminates the large-size dot number determination process of FIG. 28 and goes back to the number data generation process of the second modified example shown in FIG. 27.

Like the first modified example discussed above, the procedure of the second modified example detects the number of threshold values smaller than the dot density data of the large-size dot among the multiple threshold values included in one set and sets the detected number of the smaller threshold values to the number of the large-size dots to be created. The procedure of the second modified example specifies a starting threshold value for comparison with the dot density data, based on the number DotL of the large-size dots to be created in the last processed pixel group. For example, when the number of the large-size dots to be created in the last processed pixel group is equal to DotL, the comparison starts from the threshold value of the DotL-th ordinal number. This method ensures prompt determination of the number of the large-size dots to be created in the currently processed pixel group by a small number of comparisons, because of the reason discussed below.

In general, adjacent pixels are apt to have similar tone values of image data, so that the numbers of dots to be created in adjacent pixel groups tend to be similar to each other. When the number of the large-size dots to be created in one pixel group is set equal to DotL, it is highly possible that a value close to DotL is set to the number of the large-size dots to be created in an adjoining pixel group. The procedure of the second modified example thus starts the comparison from the threshold value of the DotL-th ordinal number and successively makes comparisons with the threshold values of the decreasing ordinal numbers when the DotL-th threshold value is greater than the dot density data of the large-size dot, while successively making comparisons with the threshold values of the increasing ordinal numbers when the DotL-th threshold value is smaller than the dot density data of the large-size dot. This procedure enables the number of the threshold values smaller than the dot density data of the large-size dot to be determined by a small number of comparisons. The procedure of this example starts the comparison from the DotL-th threshold value when the number of the large-size dots to be created in the last processed pixel group is DotL. It is, however, not essential to make the ordinal number of the starting threshold value for comparison is identical with the number of dots to be created in the last processed pixel group. The requirement is that the ordinal number of the starting threshold value for comparison is specified according to the number of dots to be created in the last processed pixel group. For example, when the number of dots to be created in the last processed pixel group is DotL, the comparison may start from the (DotL+1)-th threshold value or from the (DotL−1)-th threshold value.

Figure 29:
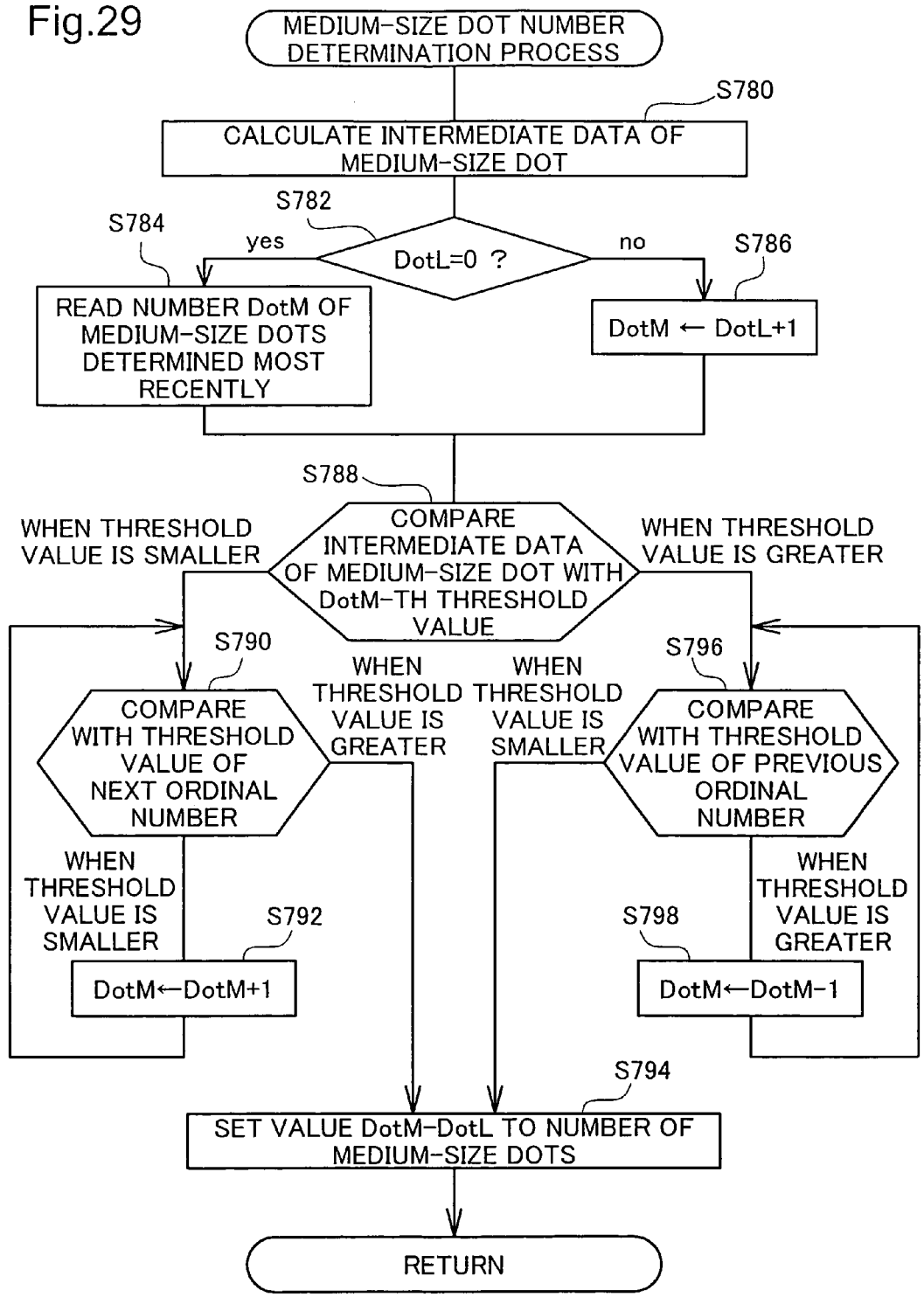
FIG. 29 is a flowchart showing the details of a process of determining the number of medium-size dots executed in the second modified example of the third embodiment.

After determination of the number of the large-size dots, the routine determines the number of the medium-size dots (step S756 in FIG. 27). FIG. 29 is a flowchart showing the details of the medium-size dot number determination process in the second modified example. The process of determining the number of the medium-size dots is described with reference to this flowchart.

The medium-size dot number determination process first calculates intermediate data of the medium-size dot (step S780). As discussed in the third embodiment, the intermediate data of the medium-size dot is obtained by adding the dot density data of the medium-size dot to the dot density data of the large-size dot.

The process subsequently determines whether the number DotL of the large-size dots determined with respect to the currently processed pixel group is equal to 0 (step S782). When the determined number DotL of the large-size dots is equal to 0 (step S782: Yes), the process reads a number DotM of the medium-size dots determined in its most recent cycle (step S784). When the determined number DotL of the large-size dots is not equal to 0 (step S782: No), on the other hand, the process increments the determined number DotL of the large-size dots by one and sets the incremented number DotL+1 to a tentative number DotM of the medium-size dots (step S786).

After setting the tentative number DotM of the medium-size dots, the process compares the calculated intermediate data of the medium-size dot with a threshold value of a DotM-th ordinal number (in an ascending order) among a set of threshold values mapped to the currently processed pixel group (step S788). When it is determined that the DotM-th threshold value is smaller than the intermediate data of the medium-size dot, the process subsequently compares the intermediate data of the medium-size dot with a threshold value of a next ordinal number, that is, with a threshold value of a (DotM+1)-th ordinal number (step S790). When it is determined that threshold value of the next ordinal number is still smaller than the intermediate data of the medium-size dot, the process increments the value DotM by one (step S792) and goes back to step S790 to compare the intermediate data of the medium-size dot with a threshold value of a further next ordinal number, that is, with a threshold value of a (DotM+2)-th ordinal number. In this manner, the intermediate data of the medium-size dot is successively compared with threshold values of the increasing ordinal numbers. When the threshold value eventually becomes greater than the intermediate data of the medium-size dot, a value (DotM−DotL) obtained by subtracting the value DotM at that moment from the determined number DotL of the large-size dots to be created in the currently processed pixel group is set to the number of the medium-size dots to be created in the currently processed pixel group (step S794).

When it is determined at step S788 that the threshold value of the DotM-th ordinal number is greater than the intermediate date of the medium-size dot, on the other hand, the process subsequently compares the intermediate data of the medium-size dot with a threshold value of a previous ordinal number, that is, with a threshold value of a (DotM−1)-th ordinal number (step S796). When it is determined that the threshold value of the previous ordinal number is still greater than the intermediate data of the medium-size dot, the process decrements the value DotM by one (step S798) and returns to step S796 to compare the intermediate data of the medium-size dot with a threshold value of a further previous ordinal number, that is, with a threshold value of a (DotM−2)-th ordinal number. In this manner, the intermediate data of the medium-size dot is successively compared with threshold values of the decreasing ordinal numbers. When the threshold value eventually becomes smaller than the intermediate data of the medium-size dot, the value (DotM−DotL) obtained by subtracting the value DotM at that moment from the determined number DotL of the large-size dots to be created in the currently processed pixel group is set to the number of the medium-size dots to be created in the currently processed pixel group (step S794). After determination of the number of the medium-size dots, the routine terminates the medium-size dot number determination process of FIG. 29 and goes back to the number data generation process of the second modified example shown in FIG. 27.

Like the first modified example discussed above, the procedure of the second modified example detects the number of threshold values smaller than the intermediate data of the medium-size dot among the multiple threshold values included in one set and specifies the number of the medium-size dots to be created, based on the detected number of the smaller threshold values. When no creation of the large-size dot has been determined with respect to the currently processed pixel group, comparison with the intermediate data of the medium-size dot starts from the threshold value of the ordinal number determined corresponding to the number of the medium-size dots to be created in the last processed pixel group. As discussed previously, the numbers of each size dot to be created in adjacent pixel groups tend to be similar to each other. In the case of no creation of the large-size dot in one pixel group, it is highly probable that no large-size dot is to be created in an adjoining, last-processed pixel group. There is accordingly a high possibility that the number of the medium-size dots to be created in the currently processed pixel group is similar to the number of the medium-size dots to be created in the last processed pixel group. The procedure of the second modified example thus specifies a starting threshold value for comparison with the intermediate data of the medium-size dot, based on the number of the medium-size dots to be created in the last processed pixel group. This method ensures prompt determination of the number of the medium-size dots to be created in the currently processed pixel group by a small number of comparisons.

When creation of the large-size dot has been determined with respect to the currently processed pixel group, on the other hand, comparison with the intermediate data of the medium-size dot starts from the threshold value of the ordinal number that is greater than the determined number DotL of the large-size dots by one, that is, from the threshold value of the (DotL+1)-th ordinal number, because of the following reason. The intermediate data of the medium-size dot is the sum of the dot density data of the large-size dot and the dot density data of the medium-size dot and is thus naturally greater than the dot density data of the large-size dot. It is accordingly apparent that the DotL-th threshold value among the multiple threshold values included in one set is smaller than the intermediate data of the medium-size dot, when the number of the large-size dots to be created is set equal to DotL. Start of the comparison from the (DotL+1)-th threshold value quickly determines the number of the threshold values smaller than the intermediate data of the medium-size dot and thereby ensures prompt determination of the number DotM of the medium-size dots to be created in the currently processed pixel group.

Figure 30:
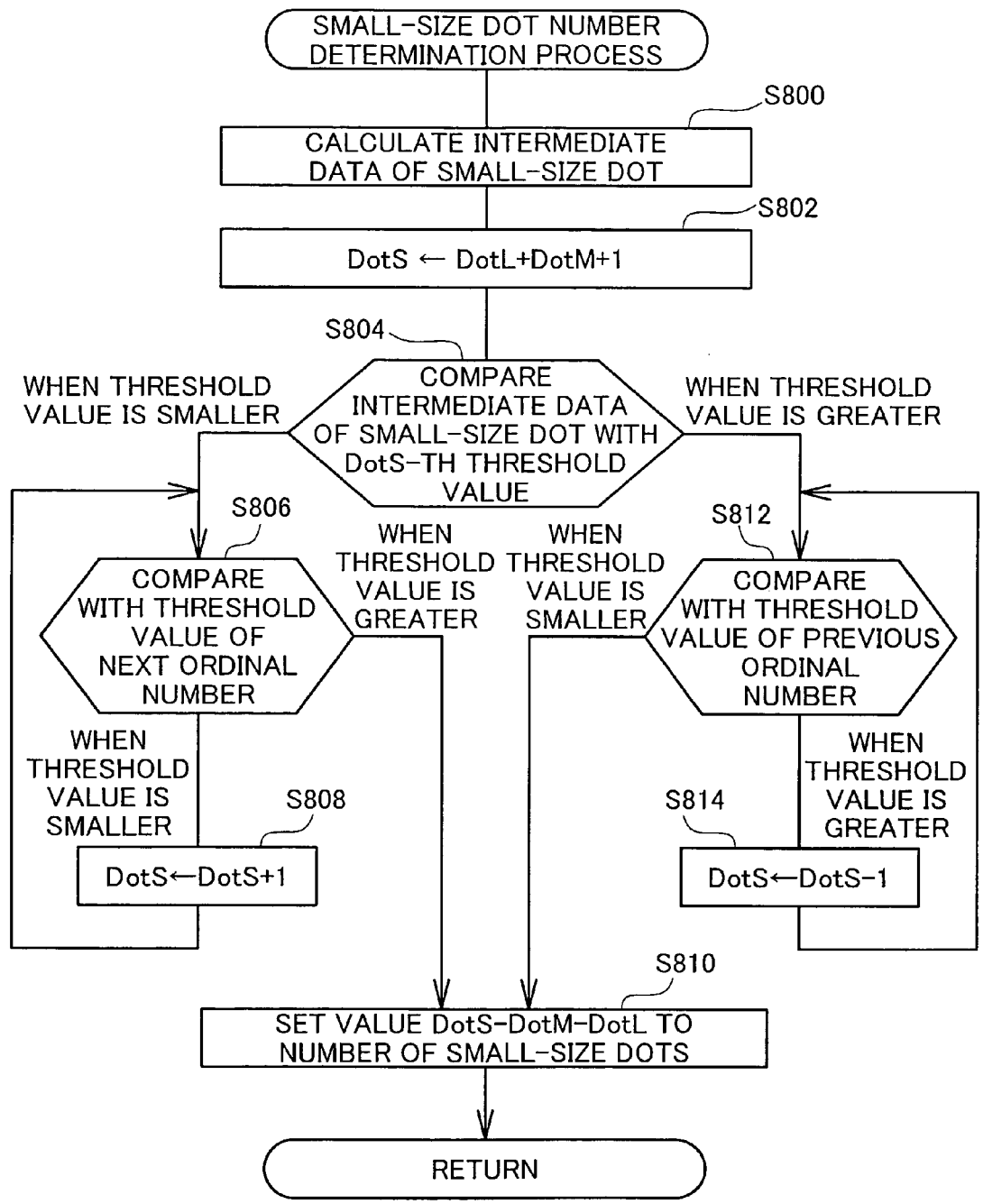
FIG. 30 is a flowchart showing the details of a process of determining the number of large-size dots executed in the second modified example of the third embodiment.

After determination of the number of the medium-size dots, the routine determines the number of the small-size dots (step S758 in FIG. 27). FIG. 30 is a flowchart showing the details of the small-size dot number determination process in the second modified example. The primary difference of the small-size dot number determination process shown in FIG. 30 from the medium-size dot number determination process of FIG. 29 is that the processing flow does not depend upon creation or non-creation of the other size dots in the respective pixels. The probability of no creation of either the large-size dot or the medium-size dot is significantly lower than the probability of no creation of the large-size dot. Application of a different method to the case of no creation of either the large-size dot or the medium-size dot accordingly has relatively small merits. Like the processing for the medium-size dot discussed above, the processing for the small-size dot may alternatively specify a starting threshold value for comparison, based on the number of the small-size dots to be created in a last processed pixel group, in the case of no creation of either the large-size dot or the medium-size dot.

The small-size dot number determination process first calculates intermediate data of the small-size dot (step S800). The intermediate data of the small-size dot is obtained by adding the dot density data of the small-size dot to the intermediate data of the medium-size dot.

The process then increments the sum of the number DotL of the large-size dots and the number DotM of the medium-size dots, which have already been determined with respect to the currently processed pixel group, by one and sets the incremented sum to a tentative number DotS of the small-size dots (step S802).

The process compares the calculated intermediate data of the small-size dot with a threshold value of a DotS-th ordinal number (in an ascending order) among a set of threshold values mapped to the currently processed pixel group (step S804). When it is determined that the DotS-th threshold value is smaller than the intermediate data of the small-size dot, the process subsequently compares the intermediate data of the small-size dot with a threshold value of a next ordinal number, that is, with a threshold value of a (DotS+1)-th ordinal number (step S806). When it is determined that threshold value of the next ordinal number is still smaller than the intermediate data of the small-size dot, the process increments the value DotS by one (step S808) and goes back to step S806 to compare the intermediate data of the small-size dot with a threshold value of a further next ordinal number, that is, with a threshold value of a (DotS+2)-th ordinal number. In this manner, the intermediate data of the small-size dot is successively compared with threshold values of the increasing ordinal numbers. When the threshold value eventually becomes greater than the intermediate data of the small-size dot, a value (DotS−DotM−DotL) at that moment is set to the number of the small-size dots to be created in the currently processed pixel group (step S810).

When it is determined at step S804 that the threshold value of the DotS-th ordinal number is greater than the intermediate date of the small-size dot, on the other hand, the process subsequently compares the intermediate data of the small-size dot with a threshold value of a previous ordinal number, that is, with a threshold value of a (DotS−1)-th ordinal number (step S812). When it is determined that the threshold value of the previous ordinal number is still greater than the intermediate data of the small-size dot, the process decrements the value DotS by one (step S814) and returns to step S812 to compare the intermediate data of the small-size dot with a threshold value of a further previous ordinal number, that is, with a threshold value of a (DotS−2)-th ordinal number. In this manner, the intermediate data of the small-size dot is successively compared with threshold values of the decreasing ordinal numbers. When the threshold value eventually becomes smaller than the intermediate data of the small-size dot, the value (DotS−DotM−DotL) at that moment is set to the number of the small-size dots to be created in the currently processed pixel group (step S810). After determination of the number of the small-size dots, the routine terminates the small-size dot number determination process of FIG. 30 and goes back to the number data generation process of the second modified example shown in FIG. 27.

The comparison of the intermediate data of the small-size dot starts from a threshold value next to the last threshold value compared with the intermediate data of the medium-size dot, that is, next to the threshold value of the (DotL+DotM) ordinal number. As mentioned previously, the intermediate data of the small-size dot is the sum of the intermediate data of the medium-size dot and the dot density data of the small-size dot. It is thus apparent that the threshold value of the (DotL+DotM)-th ordinal number in the set of the multiple threshold values is smaller than the intermediate data of the small-size dot. Start of the comparison from the threshold value of the (DotL+DotM+1)-th ordinal number thus ensures prompt determination of the number DotS of the small-size dots to be created in the currently processed pixel group.

D-3. PIXEL POSITION DETERMINATION PROCESS OF THIRD EMBODIMENT

As described above, the number data generation process of the third embodiment generates the dot number data representing the numbers of the respective size dots to be created in each pixel group and transfers the dot number data to the printer 200. The printer 200 receives the transferred data, determines the positions of the dot-on pixels of the respective size dots, and creates the respective size dots to print a result image on the printing paper. The following describes the procedure of determining the positions of the dot-on pixels of the respective size dots according to the dot number data.

Figure 31:
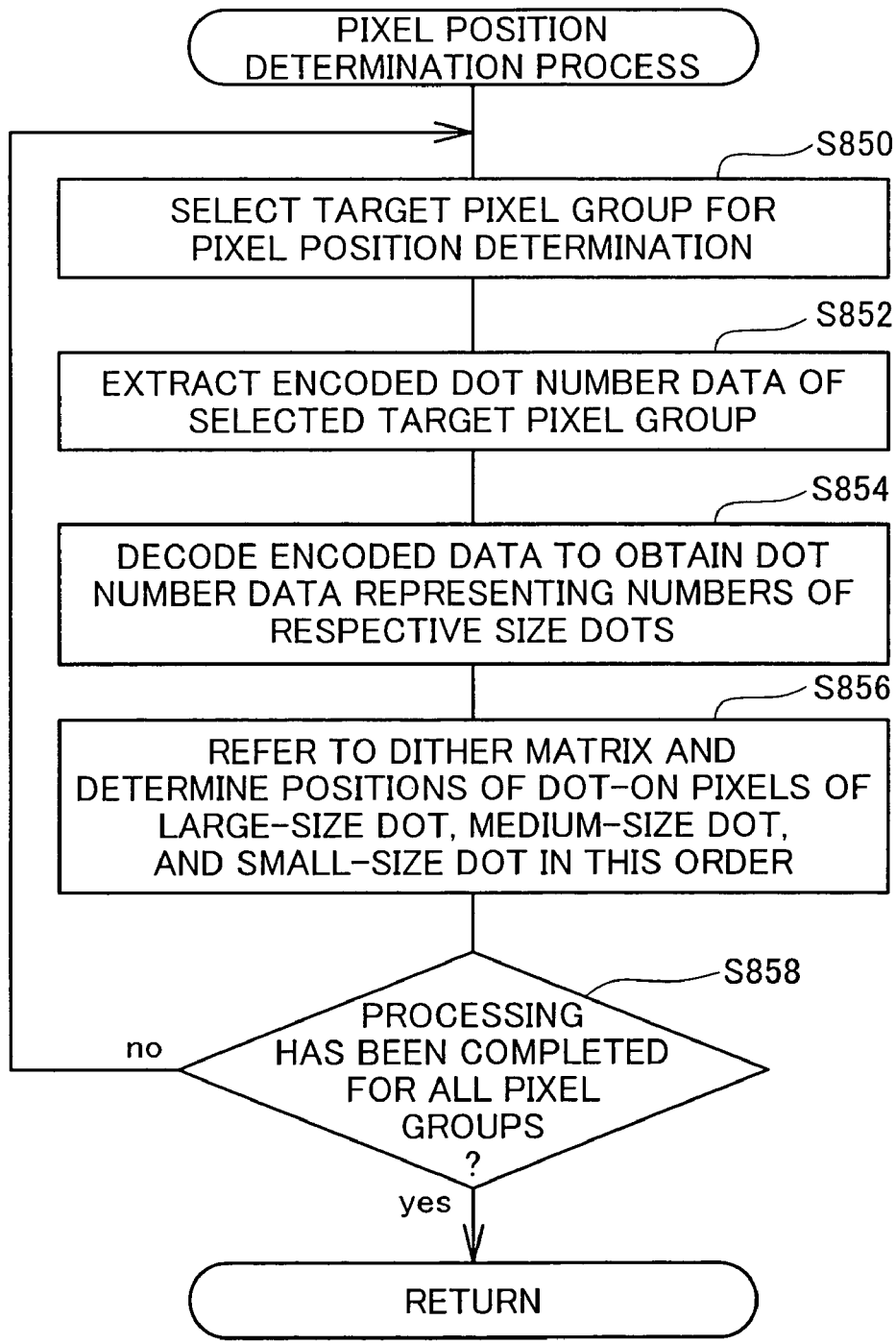
FIG. 31 is a flowchart showing the details of a pixel position determination process executed in the third embodiment.

FIG. 31 is a flowchart showing the details of the pixel position determination process in the third embodiment executed by the CPU of the control circuit 260 in the printer 200.

The pixel position determination process of the third embodiment first selects a target pixel group as an object of pixel position determination (step S850) and extracts data of the selected target pixel group from the transferred data (step S852). The dot number data have been encoded prior to transfer as mentioned previously in relation to FIG. 25. The process accordingly decodes the encoded data to the dot number data representing the numbers of the respective size dots to be created in the target pixel group (step S854).

The method refers to the conversion table shown in FIG. 25 and obtains the decoded data corresponding to the code number. For example, when the encoded data is '163', the dot numbers corresponding to the code number '163' are read from the conversion table. Namely the encoded data '163' is decoded to the dot number data representing seven large-size dots, zero medium-size dot, and one small-size dot.

After obtaining the decoded dot number data representing the numbers of the respective size dots, the process refers to a dither matrix to determine the positions of the dot-on pixels of the respective size dots (step S856). The concrete procedure of determination is discussed below with reference to FIG. 32.

Figure 32:
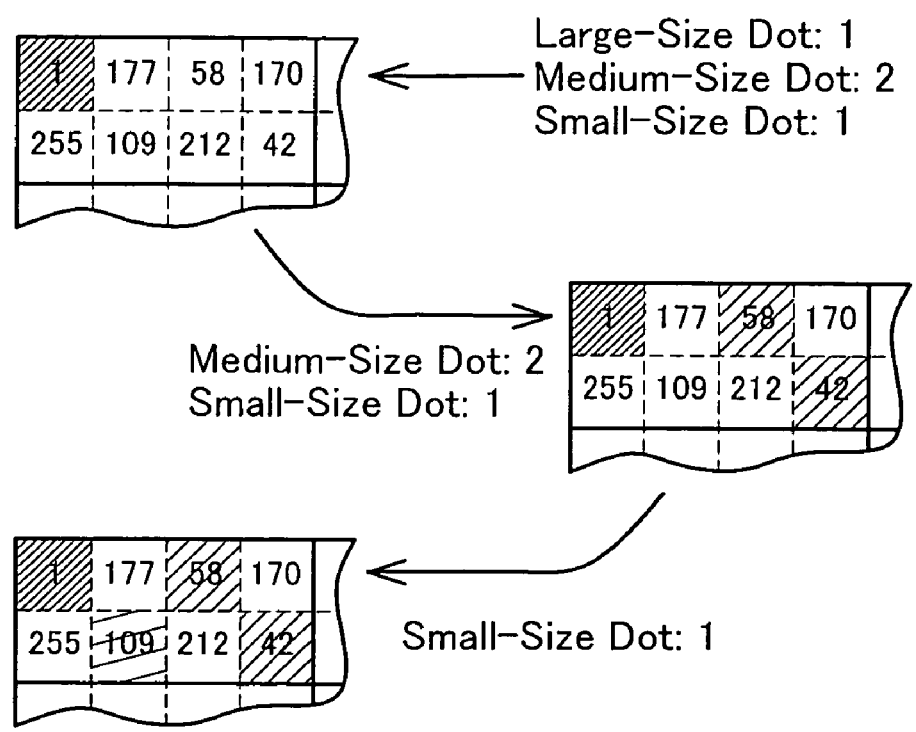
FIG. 32 shows a process of determining the positions of dot-on pixels of the respective size dots according to the dot number data in the pixel position determination process of the third embodiment.

FIG. 32 shows a process of determining the positions of the dot-on pixels of the respective size dots according to given dot number data of the respective size dots in one pixel group by referring to the dither matrix. Each rectangle of the thick solid line represents one pixel group, and the divisions of the pixel group by the thin broken lines represent multiple pixels constituting the pixel group. The numeral shown in each pixel is a threshold value set at the corresponding position in the dither matrix. The dither matrix used here is identical with the dither matrix used for determination of the numbers of the respective size dots.

In this illustrated example, it is assumed that one large-size dot, two medium-size dots, and one small-size dot are to be created in the pixel group. The method first determines the positions of the large-size dot-on pixels. As mentioned previously, the threshold values in the dither matrix show the potential for dot creation. One large-size dot is thus to be created in the pixel having the smallest threshold value. The method determines the positions of the medium-size dot-on pixels after determination of the positions of the large-size dot-on pixels. Two medium-size dots are to be created, while the pixel having the smallest threshold value has already been set for creation of the large-size dot. Two medium-size dots are thus to be created in the pixels having the second smallest threshold value and the third smallest threshold value. The method determines the positions of the small-size dot-on pixels after determination of the positions of the medium-size dot-on pixels. One small-size dot is to be created, while the pixels having the smallest, the second smallest, and the third smallest threshold values have already been set for creation of the large-size dot and the medium-size dot. One small-size dot is thus to be created in the pixel having the fourth smallest threshold value.

In the illustrated example of FIG. 32, the positions of the dot-on pixels are determined in the order of the large-size dot, the medium-size dot, and the small-size dot. The pixel filled with dense slant lines denotes the pixel set for creation of a large-size dot. The pixels filled with slant lines denote the pixels set for creation of medium-size dots. The pixel filled with sparse slant lines denotes the pixel set for creation of a small-size dot. The process refers to the dither matrix and determines the positions of the dot-on pixels with regard to the respective size dots at step S856 in the flowchart of FIG. 31.

In the above description, the encoded data is decoded to the dot number data representing the numbers of the respective size dots. As mentioned above, the positions of the dot-on pixels are determined in the order of the large-size dot, the medium-size dot, and the small-size dot. The encoded data may thus be decoded to data representing the number of the large-size dot, the total number of the large-size dot and the medium-size dot, and the total number of all the large-size dot, the medium-size dot, and the small-size dot, instead of the dot number data representing the numbers of the respective size dots. For example, in the illustrated example of FIG. 32, the encoded data is decoded to data representing {the number of the large-size dot: 1, the total number of the large-size dot and the medium-size dot: 3, the total number of the large-size dot, the medium-size dot, and the small-size dot: 4}, instead of the dot number data representing {the number of the large-size dot: 1, the number of the medium-size dot: 2, the number of the small-size dot: 1}.

FIG. 33 conceptually shows a decoding table referred to for such modified decoding. This decoding method desirably accelerates the pixel position determination process. In the case of determining the positions of the medium-size dot-on pixels, since the total number of the large-size dot and the medium-size dot is 3, the method selects the pixels having the smallest to the third smallest threshold values. The method then excludes the pixel set for creation of another size dot (the large-size dot) and determines that the medium-size dot is to be created in the remaining selected pixels. This modified method determines the positions of the dot-on pixels without specifically counting the number of pixels set for creation of the other size pixels, thus desirably ensuring the quicker processing.

After determination of the positions of the dot-on pixels with regard to the respective size dots in one pixel group (step S856 in FIG. 31), the process determines whether the pixel position determination has been completed for the data of all the pixel groups received from the computer 100 (step S858). When there is any unprocessed pixel group (step S858: No), the process returns to step S850 to select a next pixel group and repeats the above series of processing. When the dot-on pixel positions have been determined for all the pixel groups (step S858: Yes), the program terminates the pixel position determination process of FIG. 31 and goes back to the image printing process. The printer 200 then creates the respective size dots on the printing paper to print a resulting processed image according to the image data.

The image printing process of the third embodiment discussed above is effectively applied to the printer 200 as the multi-valued printer. The printer 200 receives the dot number data of the respective size dots transferred from the computer 100 and prints a resulting processed image according to the transferred data. This arrangement attains quicker data transfer, compared with the method of transferring the dot state data representing the dot on-off state of the individual pixels.

Even when an image includes a large number of pixels, the procedure of the third embodiment thus ensures prompt image printing.

E. MODIFICATIONS

The technique of the invention is not restricted to the embodiments or their modified examples discussed above. There may be diversity of other modifications. Some examples of possible modification are described briefly below.

(1) First Modified Example

The number data generation process in any of the above embodiments applies the dither method to determine the dot on-off state. Any other technique may alternatively be adopted for determination of the dot number to attain the adequate density according to the tone values of the image data.

Figure 34:
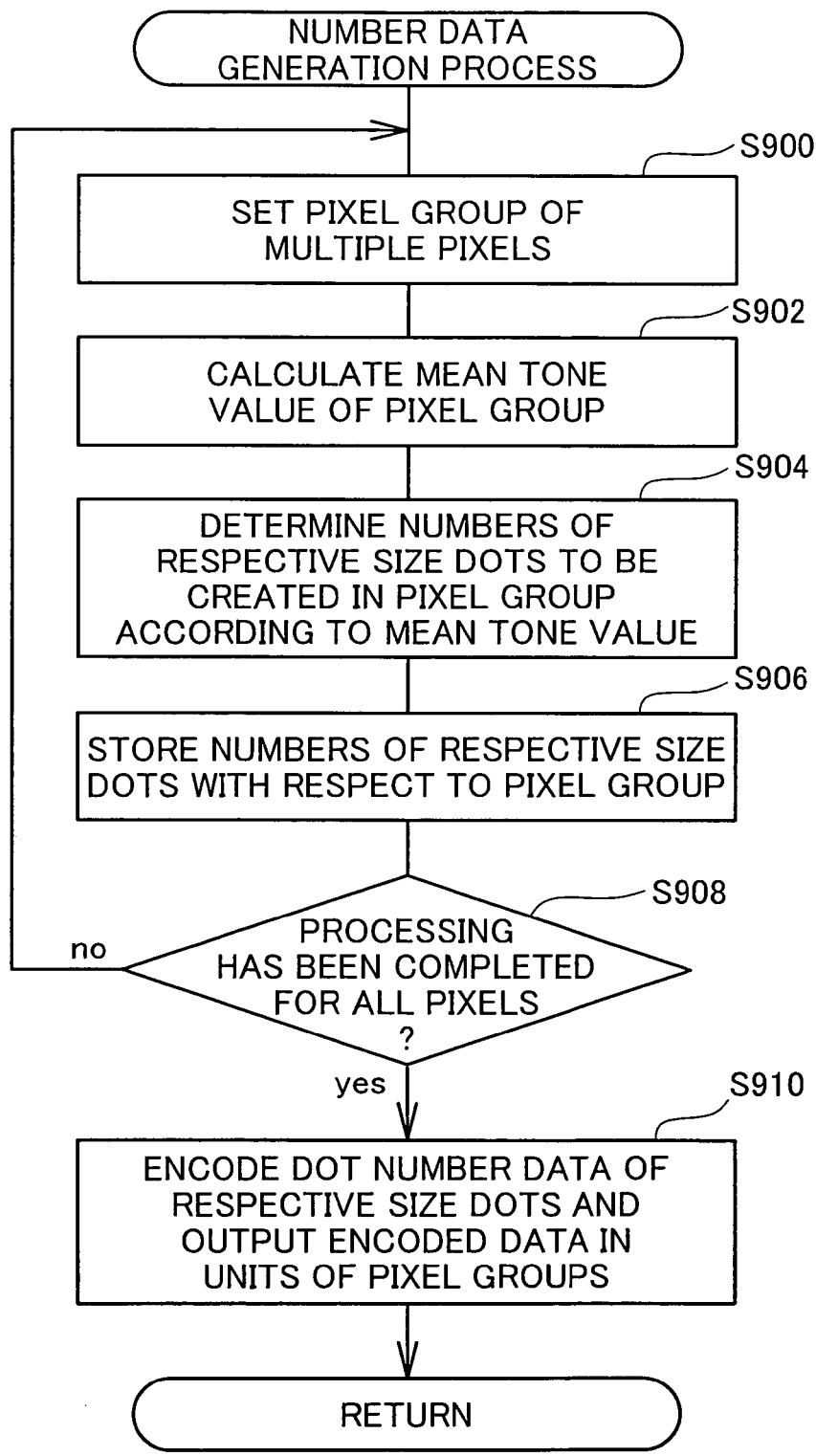
FIG. 34 is a flowchart showing the details of a number data generation process executed in an image printing process of a first modified example.

For example, one modified example may adopt a number data generation process shown in FIG. 34 to calculate a mean tone value of respective pixels included in each pixel group and unequivocally determine the numbers of respective size dots to be created in the pixel group according to the calculated mean tone value. The procedure of this modified example is briefly described with reference to the flowchart of FIG. 34.

Figure 35:
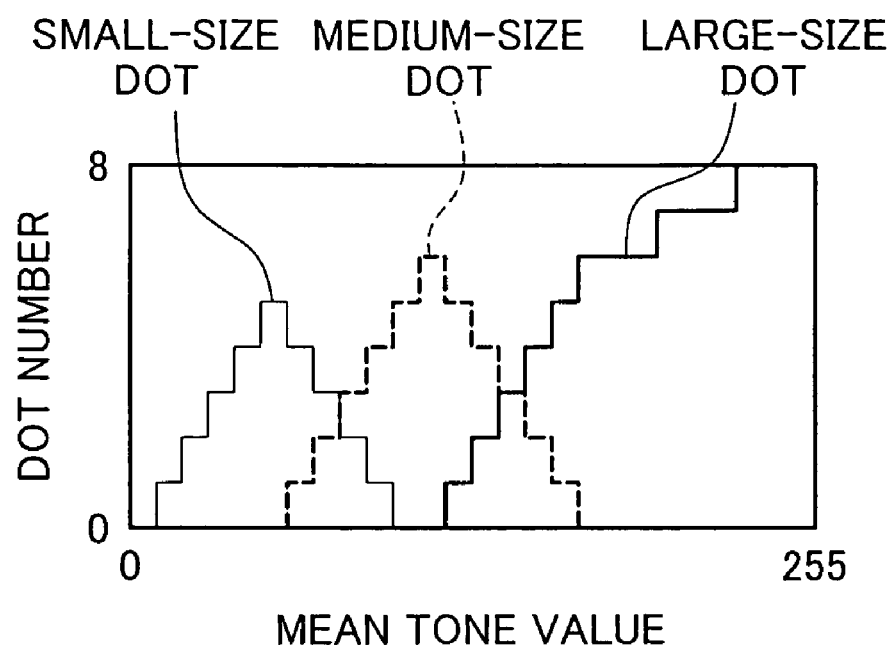
FIG. 35 shows a process of unequivocally determining the numbers of respective size dots according to a mean tone value in each pixel group.

The number data generation process of this modified example first sets a pixel group having a predetermined number of multiple pixels (step S900) and calculates a mean tone value of the respective pixels included in the pixel group (step S902). The process then unequivocally determines the numbers of the respective size dots to be created in the pixel group according to the calculated mean tone value. A concrete procedure sets variations in numbers of the respective size dots to be created in one pixel group against the mean tone value as shown in the map of FIG. 35. The procedure reads the numbers of the respective size dots corresponding to the given mean tone value of the pixel group from this map. The map of FIG. 35 shows the variations in numbers of the three different size dots, but there may be a greater or less number of variable-size dots.

The process stores the determined numbers of the respective size dots with respect to the pixel group (step S906) and determines whether the processing has been completed for all the pixels (step S908). When there is any unprocessed pixel, the process returns to step S900 and repeats the above series of processing. When the processing of all the pixels has been completed, on the other hand, the process encodes the stored numbers of the respective size dots according to the method of FIG. 33 discussed above and outputs the encoded dot number data to the printer 200 (step S910).

The printer 200 receives the dot number data output from the computer 100 and executes the pixel position determination process discussed above to print a resulting processed image. The procedure of this modified example readily generates the dot number data with regard to each pixel group. This arrangement ensures quick output of the dot number data and thereby prompt image printing.

(2) Second Modified Example

In any of the above embodiments, the number data generation process first sets a pixel group having a predetermined number of multiple pixels and then determines the number of dots to be created in the pixel group. One modified procedure may first determine the dot on-off state of individual pixels and then set pixel groups, each having a predetermined number of multiple pixels.

Figure 36:
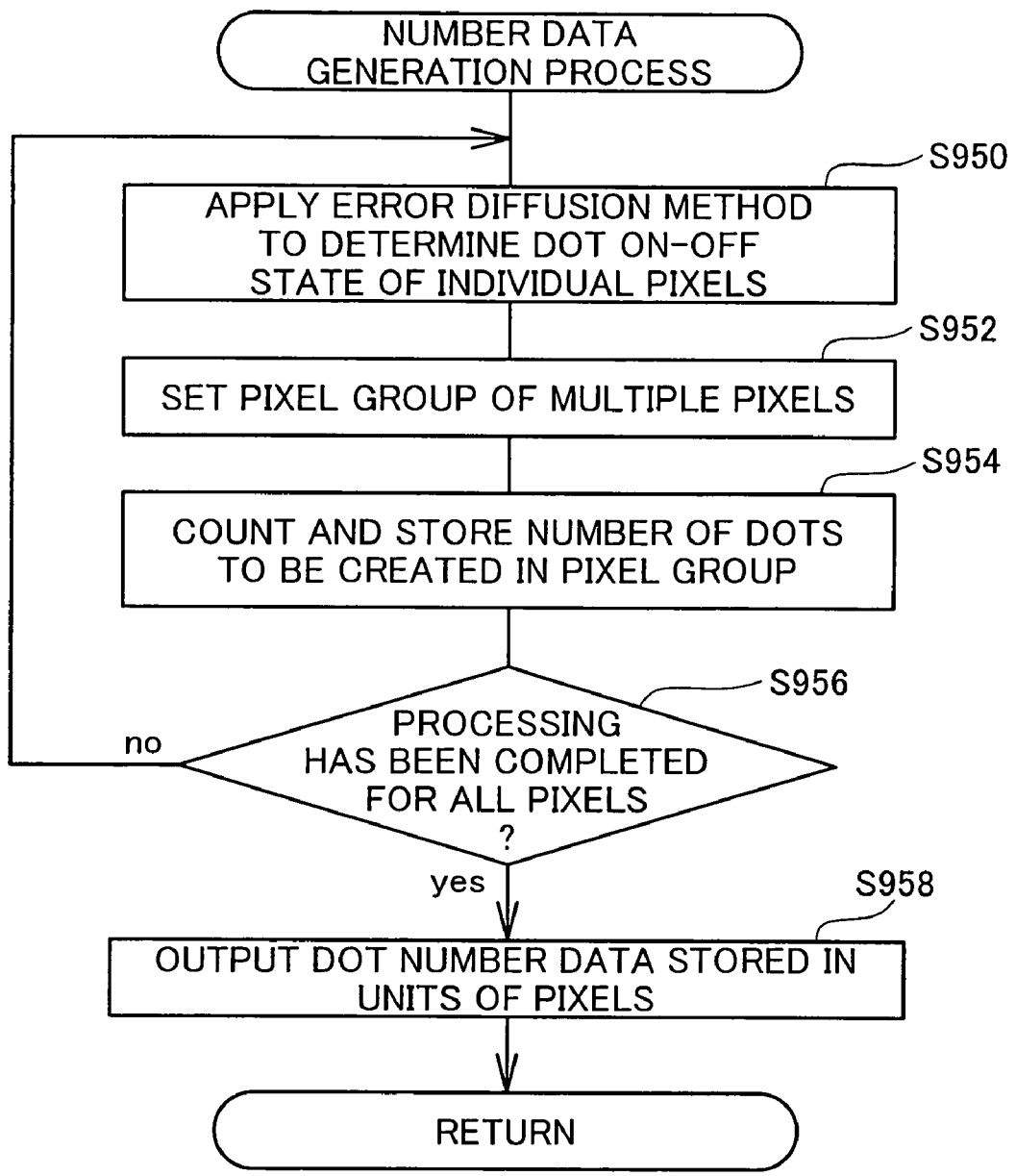
FIG. 36 is a flowchart showing the details of a number data generation process executed in an image printing process of a second modified example.

For example, a modified process shown in the flowchart of FIG. 36 applies an error diffusion method to determine the dot on-off state of all the pixels included in the input image data (step S950). The modified process then sets a pixel group having a predetermined number of multiple pixels (step S952), and counts and stores the number of dots to be created in the pixel group (step S954).

After storage of the dot number data with regard to one pixel group, the process determines whether the processing has been completed for all the pixels (step S956). When there is any unprocessed pixel, the process goes back to step S900 and repeats the above series of processing. When the processing of all the pixels has been completed, on the other hand, the process outputs the dot number data stored in units of pixel groups to the printer 200 (step S958).

The printer 200 receives the dot number data output from the computer 100 and executes the pixel position determination process described above to determine the positions of the dot-on pixels in each pixel group. The modified procedure of FIG. 36 adopts the error diffusion method for determination of the number of dots to be created in each pixel group. This procedure may refer to the dither matrix to determine the positions of the dot-on pixels.

As is known in the art, application of the error diffusion method to determine the dot on-off state gives the substantially noise-free, good picture quality in an area of the low dot formation density. The error diffusion method is especially effective for printing an image of the low dot formation density, for example, where pixel groups with dot formation are sparsely distributed among a large number of pixels groups with no dot formation. Determination of the number of dots to be created in each pixel group according to the error diffusion method enables the dots to be adequately distributed and gives a high-quality resulting image.

(3) Third Modified Example

Any of the embodiments discussed above determines the positions of the dot-on pixels by referring to the dither matrix. The method of using the priority order matrix for the pixel position determination does not directly refer to the dither matrix but indirectly uses the dither matrix to determine the positions of the dot-on pixels, since the priority order matrix is prepared corresponding to the dither matrix. Such dependence on the dither matrix is, however, not essential as long as the positions of the dot-on pixels are determinable with different settings of the priority order to the respective pixel groups.

Figure 37:
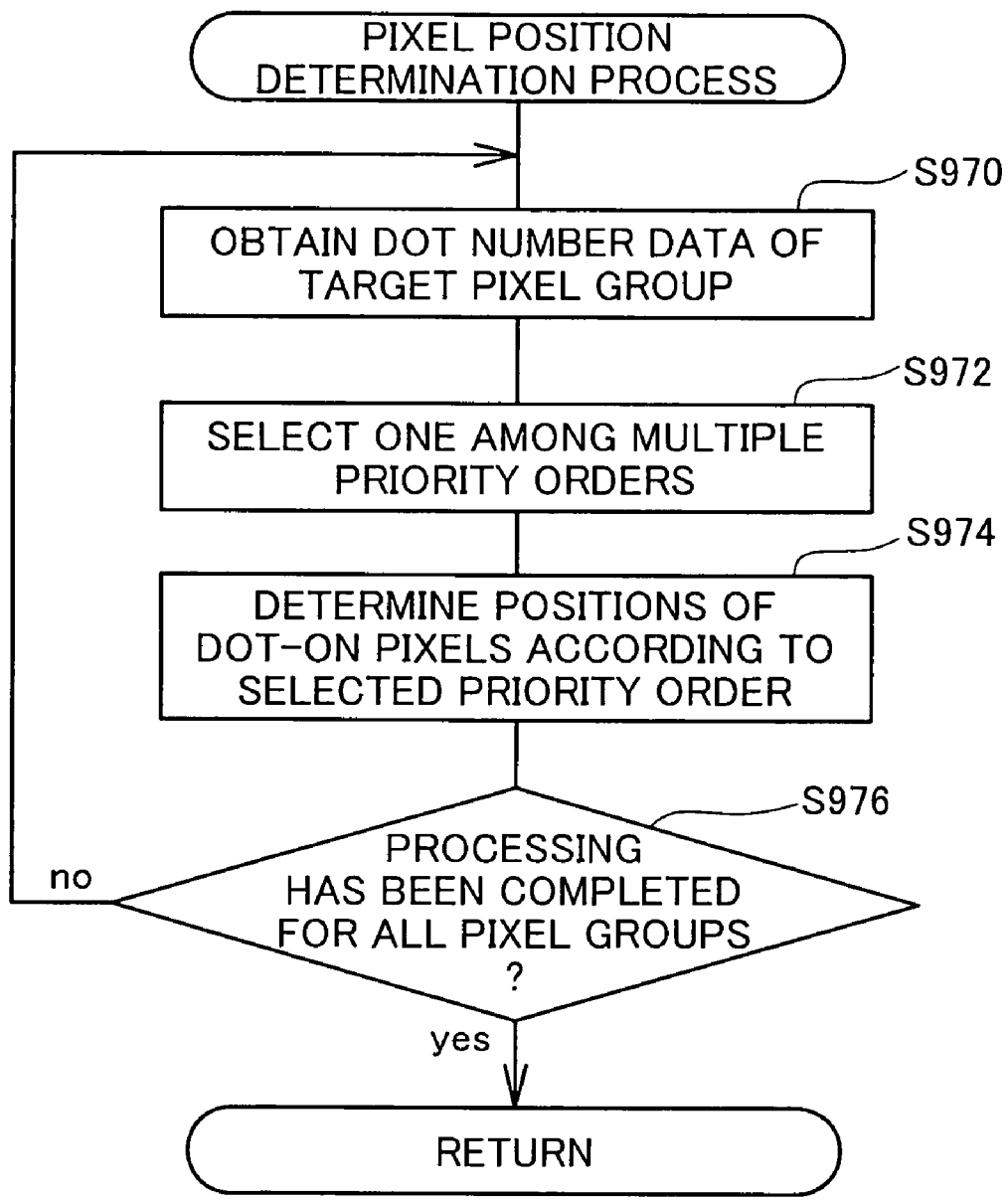
FIG. 37 is a flowchart showing the details of a pixel position determination process executed in an image printing process of a third modified example.

For example, a modified process shown in the flowchart of FIG. 37 stores multiple priority orders and selects an arbitrary priority order for each pixel group among the stored multiple priority orders to determine the positions of the dot-on pixels. The procedure of this modified example is briefly described with reference to the flowchart of FIG. 37.

Figure 38:
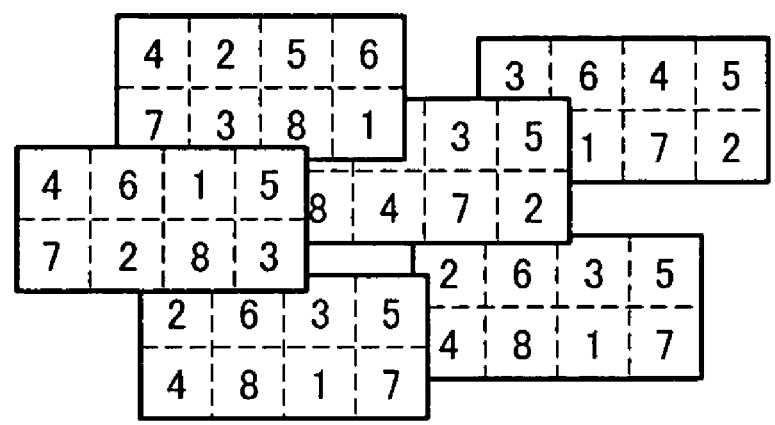
FIG. 38 shows storage of multiple priority orders for individual pixels included in each pixel group.

When the pixel position determination process of this modified example starts, the CPU of the control circuit 260 in the printer 200 first selects a target pixel group as an object of the pixel position determination and obtains the dot number data of the selected target pixel group (step S970). The process then selects arbitrary one among multiple priority orders stored in advance (step S972). The multiple priority orders of respective pixels in each pixel group have been stored in the ROM of the control circuit 260. FIG. 38 shows multiple priority orders stored in the ROM. The process selects one of the multiple priority orders at step S972.

The process refers to the selected priority order and determines the positions of the dot-on pixels in the target pixel group (step S974). After determination of the positions of the dot-on pixels in one pixel group, the process determines whether the processing has been completed for all the pixel groups (step S976). When there is any unprocessed pixel group, the process goes back to step S970 and repeats the above series of processing to determine the positions of the dot-on pixels in a next target pixel group. This series of processing is repeated until the processing of all the pixel groups has been completed.

The procedure of this modified example determines the positions of the dot-on pixels according to the dot number data of each pixel group. Different priority orders are generally selected for the individual pixel groups to be referred to for determination of the positions of the dot-on pixels. This arrangement prevents dot formation in an identical pattern and thus desirably avoids potential deterioration of the picture quality.

The embodiments and their modified examples discussed above are to be considered in all aspects as illustrative and not restrictive. There may be many other modifications, changes, and alterations without departing from the scope or spirit of the main characteristics of the present invention. For example, the software programs (application programs) that attain the diverse functions discussed above may be supplied to the main memory of the computer system or to an external storage device via a communication line and be executed by the computer system. The software programs may otherwise be read from CD-ROMs or flexible disks to be executed.

The embodiments and the modified examples discussed above regard the printers that create dots to print an image on printing paper. The technique of the invention is, however, not restricted to the printers but is also effectively applicable to liquid crystal display devices that disperse luminescent spots at an adequate density on a liquid crystal display screen to express an image of continuously varying tone.

What is claimed is:
1. An image output control system comprising an image processing device that makes image data subjected to a preset series of image processing, and an image output device that creates multiple different types of dots having different densities per unit area according to a result of the preset series of image processing, so as to output an image,
 said image processing device comprising:
  a dot number determination module that determines a number of dots to be created in each pixel group, which is set to have a predetermined number of multiple pixels having a two-dimensional size comprising multiple pixels arranged in primary and secondary scan directions included in the image, with respect to each of the multiple different types of dots according to the image data; and
  a number data output module that outputs the determined number of dots to be created in the pixel group with respect to each type of dot, as dot number data of the pixel group, to said image output device,
 said image output device comprising:
  a number data receiving module that receives the dot number data of the pixel group with respect to each type of dot;
  a priority order specification module that specifies a priority order of individual pixels in the pixel group for dot creation;

a pixel position determination module that determines positions of dot-on pixels in the pixel group with respect to each type of dot, based on the dot number data of the pixel group with respect to each type of dot and the specified priority order; and a dot formation module that creates the multiple different types of dots at the determined positions of the dot-on pixels, wherein said dot number determination module comprises:

a first dot density data generation module that generates first dot density data representing a density of a first dot to be created in the pixel group, based on the image data, where the first dot has a highest density per unit area among the multiple different types of dots;

a second dot density data generation module that generates second dot density data representing a density of either of the first dot and a second dot to be created in the pixel group, based on the image data, where the second dot has a second highest density per unit area among the multiple different types of dots;

a threshold value group storage module that stores a threshold value group consisting of multiple threshold values, which respectively correspond to the predetermined number of multiple pixels included in the pixel group;

a first dot number determination module that compares the first dot density data with the threshold values included in the threshold value group and sets a number of threshold values that are smaller than the first dot density data to a number of the first dots to be created in the pixel group; and a second dot number determination module that compares the second dot density data with the threshold values included in the threshold value group and sets a number of the second dots to be created in the pixel group, based on the preset number of the first dots and a number of threshold values that are smaller than the second dot density data, said second dot number determination module comparing the second dot density data with only threshold values that are greater than the first dot density data and counting the number of the threshold values that are smaller than the second dot density data, so as to set the number of the second dots to be created in the pixel group.

2. An image output control system in accordance with claim 1, wherein said priority order specification module selects one out of multiple options for the priority order, which are provided in advance, with respect to the pixel group.

3. An image output control system in accordance with claim 1, wherein said number data output module has a dot number combination mapping table that maps each combination of numbers of the multiple different types of dots to a preset code, said number data output module refers to the dot number combination mapping table to convert a combination of the numbers of the respective types of dots determined with respect to the pixel group to a corresponding preset code and outputs the preset code, in place of the dot number data of the pixel group, to said image output device, and said number data receiving module comprises:

a code mapping table that maps each preset code to a combination of the numbers of the multiple different types of dots; and a number data conversion module that receives the output preset code of the pixel group, and refers to the code mapping table to reconvert the received preset code to dot number data of the pixel group with respect to each type of dot.

4. An image output control system in accordance with claim 1, wherein said pixel position determination module sequentially determines the positions of the dot-on pixels with respect to each type of dot in a descending order of the density per unit area of the multiple different types of dots.

5. An image output control system in accordance with claim 1, wherein said threshold value group storage module stores the multiple threshold values of the threshold value group in an order of magnitude of the respective threshold value in the threshold value group, and said second dot number determination module selects the threshold values that are greater than the first dot density data, on the basis of the order of magnitude.

6. An image output control system in accordance with claim 5, wherein said first dot number determination module starts comparison of the first dot density data from a threshold value having an ordinal number selected on the basis of a most-recent setting of the number of the first dots, and counts the number of the threshold values that are smaller than the first dot density data.

7. An image output control system in accordance with claim 6, wherein said second dot number determination module, in the case of absence of any threshold value that is smaller than the first dot density data, starts comparison of the second dot density data from a threshold value having an ordinal number selected on the basis of a most-recent setting of the number of the second dots.

8. An image output control method that makes image data subjected to a preset series of image processing and creates multiple different types of dots having different densities per unit area according to a result of the preset series of image processing, so as to output an image, said image output control method comprising: determining a number of dots to be created in each pixel group, which is set to have a predetermined number of multiple pixels having a two-dimensional size comprising multiple pixels arranged in primary and secondary scan directions included in the image, with respect to each of the multiple different types of dots according to the image data; specifying a priority order of individual pixels in the pixel group for dot creation; determining positions of dot-on pixels in the pixel group with respect to each type of dot, based on the determined number of dots to be created in the pixel group with respect to the type of dot and the specified priority order; and creating the multiple different types of dots at the determined positions of the dot-on pixels on an output medium, wherein said step for determining a number of dots to be created in each pixel group comprises: (I-a) generating first dot density data representing a density of a first dot to be created in the pixel group, based on the image data, where the first dot has a highest density per unit area among the multiple different types of dots; (I-b) generating second dot density data representing a density of either of the first dot and a second dot to be created in the pixel group, based on the image data, where the second dot has a second highest density per unit area among the multiple different types of dots; (I-c) storing a threshold value group consisting of multiple threshold values, which respectively correspond to the predetermined number of multiple pixels included in the pixel group; (I-d) comparing the first dot density data with the threshold values included in the threshold value group and setting a number of threshold values that are smaller than the first dot density data to a number of the first dots to be created in the pixel group; and (I-e) comparing the second dot density data with the threshold values included in the threshold value group and setting a number of the second dots to be created in the pixel group, based on a number of threshold values that are smaller than the second dot density data, said step (I-e) comparing the second dot density data with only threshold values that are greater than the first dot density data and counting the number of the threshold values that are smaller than the second dot density data, so as to set the number of the second dots to be created in the pixel group, and wherein at least one step of the image output control method is executed by a processor.

9. A computer program product comprising a non-transitory computer-readable storage medium having an image output control program stored thereon, the image output control program being executed by a computer to make image data subjected to a preset series of image processing and create multiple different types of dots having different densities per unit area according to a result of the preset series of image processing, thus outputting an image, the image output control program comprising: a first program code for determining a number of dots to be created in each pixel group, which is set to have a predetermined number of multiple pixels having a two-dimensional size comprising multiple pixels arranged in primary and secondary scan directions included in the image, with respect to each of the multiple different types of dots according to the image data; a second program code for specifying a priority order of individual pixels in the pixel group for dot creation; a third program code for determining positions of dot-on pixels in the pixel group with respect to each type of dot, based on the determined number of dots to be created in the pixel group with respect to the type of dot and the specified priority order; and a fourth program code for creating the multiple different types of dots at the determined positions of the dot-on pixels on an output medium, wherein said first program code for determining a number of dots to be created in each pixel group comprises: program code for generating first dot density data representing a density of a first dot to be created in the pixel group, based on the image data, where the first dot has a highest density per unit area among the multiple different types of dots; program code for generating second dot density data representing a density of either of the first dot and a second dot to be created in the pixel group, based on the image data, where the second dot has a second highest density per unit area among the multiple different types of dots; program code for storing a threshold value group consisting of multiple threshold values, which respectively correspond to the predetermined number of multiple pixels included in the pixel group; program code for comparing the first dot density data with the threshold values included in the threshold value group and setting a number of threshold values that are smaller than the first dot density data to a number of the first dots to be created in the pixel group; and program code for comparing the second dot density data with the threshold values included in the threshold value group and setting a number of the second dots to be created in the pixel group, based on a number of threshold values that are smaller than the second dot density data, said program code for comparing the second dot density data with the threshold values included in the threshold value group comparing the second dot density data with only threshold values that are greater than the first dot density data and counting the number of the threshold values that are smaller than the second dot density data, so as to set the number of the second dots to be created in the pixel group.

10. An image output control system comprising an image processing device that makes image data subjected to a preset series of image processing, and an image output device that creates multiple different types of dots having different densities per unit area according to a result of the preset series of image processing, so as to output an image, said image processing device comprising:
a number calculator that calculates a number of dots to be created in each pixel group, which is set to have a predetermined number of multiple pixels having a two-dimensional size comprising multiple pixels arranged in primary and secondary scan directions included in the image, with respect to each of the multiple different types of dots according to the image data; and
a data transmitter that outputs the calculated number of dots to be created in the pixel group with respect to each type of dot, as dot number data of the pixel group, to said image output device, said image output device comprising:
a data receiver that receives the dot number data of the pixel group with respect to each type of dot;
a priority order operator that specifies a priority order of individual pixels in the pixel group for dot creation;
a position setter that sets positions of dot-on pixels in the pixel group with respect to each type of dot, based on the dot number data of the pixel group with respect to each type of dot and the specified priority order; and
a dot creator that creates the multiple different types of dots at the set positions of the dot-on pixels, wherein said number calculator comprises:
a first dot density data generator that generates first dot density data representing a density of a first dot to be created in the pixel group, based on the image data, where the first dot has a highest density per unit area among the multiple different types of dots;
a second dot density data generator that generates second dot density data representing a density of either of the first dot and a second dot to be created in the pixel group, based on the image data, where the second dot has a second highest density per unit area among the multiple different types of dots;
a threshold value group storage that stores a threshold value group consisting of multiple threshold values, which respectively correspond to the predetermined number of multiple pixels included in the pixel group;
a first dot number determiner that compares the first dot density data with the threshold values included in the threshold value group and sets a number of threshold values that are smaller than the first dot density data to a number of the first dots to be created in the pixel group; and
a second dot number determiner that compares the second dot density data with the threshold values included in the threshold value group and sets a number of the second dots to be created in the pixel group, based on the preset number of the first dots and a number of threshold values that are smaller than the second dot density data,
said second dot number determiner comparing the second dot density data with only threshold values that are greater than the first dot density data and counting the number of the threshold values that are smaller than the second dot density data, so as to set the number of the second dots to be created in the pixel group.

11. The image output control system in accordance with claim 1, wherein the pixel group has M×N pixels, with M and N being integers greater than one.

12. An image output control system in accordance with claim 1, wherein said dot number determination module uses one correspondence relation defined for each pixel group among previously prepared multiple correspondence relations to determine the number of dots, and
  said correspondence relation is obtained from the arrangement of multiple threshold values, which corresponds to the number of pixels included in the pixel group and is taken out from a global dither matrix.

13. An image output control system in accordance with claim 11, wherein the pixel group includes 4×2 pixels.

* * * * *